(12) United States Patent
Guan et al.

(10) Patent No.: US 11,444,718 B2
(45) Date of Patent: Sep. 13, 2022

(54) OPTICAL LINE TERMINAL AND OPTICAL FIBER ACCESS SYSTEM WITH INCREASED CAPACITY

(71) Applicant: DANMARKS TEKNISKE UNIVERSITET, Kgs. Lyngby (DK)

(72) Inventors: Pengyu Guan, Nærum (DK); Leif Katsuo Oxenløwe, Hillerød (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 0 days.

(21) Appl. No.: 16/644,110

(22) PCT Filed: Sep. 5, 2018

(86) PCT No.: PCT/EP2018/073867
§ 371 (c)(1),
(2) Date: Mar. 3, 2020

(87) PCT Pub. No.: WO2019/048476
PCT Pub. Date: Mar. 14, 2019

(65) Prior Publication Data
US 2020/0213027 A1 Jul. 2, 2020

(30) Foreign Application Priority Data
Sep. 5, 2017 (EP) .................................... 17189434

(51) Int. Cl.
*H04J 14/02* (2006.01)
(52) U.S. Cl.
CPC ...... *H04J 14/0223* (2013.01); *H04J 14/0209* (2013.01); *H04J 14/0246* (2013.01); *H04J 14/0267* (2013.01)

(58) Field of Classification Search
CPC .................................................. H04J 14/0223
See application file for complete search history.

(56) References Cited

U.S. PATENT DOCUMENTS

| 5,453,871 A | 9/1995 | Kolner et al. |
| 2002/0196491 A1 | 12/2002 | Deng et al. |

(Continued)

FOREIGN PATENT DOCUMENTS

| EP | 3107306 A1 | 12/2016 |
| JP | 4252470 B2 | 4/2009 |

(Continued)

OTHER PUBLICATIONS

K. Min et al., "An OTDM-To-WDM Converter Using Optical Fourier Transformation", International Journal of Scientific & Technology Research vol. 5, Issue 06, Jun. 2016 (Year: 2016).*

(Continued)

*Primary Examiner* — Shi K Li
(74) *Attorney, Agent, or Firm* — Hamilton, Brook, Smith & Reynolds, P.C.

(57) ABSTRACT

The present disclosure relates to an optical fiber access system based on passive optical networks. In particular the present disclosure relates to a PON system with increased capacity and a method for increasing the capacity in a PON system. One embodiment relates to an optical line terminal for a passive optical network, comprising at least one transmitter for generating a time division multiplexed (TDM) downstream optical data signal, a first time lens optical signal processor configured to convert the downstream TDM signal to a downstream WDM signal for distribution to a plurality of users, and at least one receiver for receiving and processing an upstream signal from said users.

18 Claims, 17 Drawing Sheets

(56) References Cited

U.S. PATENT DOCUMENTS

| | | | |
|---|---|---|---|
| 2003/0020984 A1 | 1/2003 | Bhatia et al. | |
| 2009/0083817 A1 | 3/2009 | Van Den et al. | |
| 2010/0142955 A1 | 6/2010 | Yu et al. | |
| 2010/0221011 A1* | 9/2010 | Pinceman | H04J 14/0226 398/79 |
| 2014/0301734 A1* | 10/2014 | Fang | H04B 10/60 398/76 |
| 2016/0197698 A1* | 7/2016 | Oxenlowe | H04B 10/675 398/79 |
| 2021/0359780 A1 | 11/2021 | Guan | |

FOREIGN PATENT DOCUMENTS

| | | |
|---|---|---|
| WO | 2015131908 A1 | 9/2015 |
| WO | 2016106599 A1 | 7/2016 |
| WO | 2019048476 A1 | 3/2019 |
| WO | 2020064672 A1 | 4/2020 |

OTHER PUBLICATIONS

5G PPP 5G Vision. Whitepaper. Feb. 2015.

Gao: Impact of backreflections on single-fiber bidirectional wavelength-division-multiplexing passive optical networks (WDM-PONs), 2013.

Guan et al.: "128 x 2 GB/s WDM PON System with a Single TDM Time Lens Source using an AlGaAs-On-lnsulator Waveguide", CLEO2018, SM2C.3 (2018).

Guan et al.: "Time Lens-Based Optical Fourier Transformation of All-Optical Signal Processing of Spectrally-Efficient Data", Journal of Lightwave Technology, vol. 35, No. 4, Feb. 15, 2017, pp. 799-806.

Guan et al.: Highly Flexible WDM PON System with a Single TDM Time Lens Source Enabling Record 150 km Downstream Reach, OFC2018. Th2A.54, (2018).

Houtsma et al.: "A Study of Options for High-Speed TDM-PON Beyond 10G", JLT, 35 (4), 1059, (2017).

Luo et al.: "Time- and Wavelength-Division Multiplexed Passive Optical Network (TWDM-PON) for Next-Generation PON Stage 2 (NG-PON2)", JLT, 31(4), 587, (2013).

Nakazawa et al.: "Ideal Distortion-Free Transmission Using Optical Fourier Transformation and Fourier Transform-Limited Optical Pulses", PTL. 16, 1059, (2004).

Nesset: "PON Roadmap [Invited]", IEEE J. Opt. Commun. 9 (1), A71, (2017).

Ottaviano et al.: "Low-loss high-confinement waveguides and microring resonators in AlGaAs-on-insulator", Opt. Letters 41, 3996 (2016).

Petrillo et al.: "Scalable 1.28-Tb/s Transmultiplexer Using a Time Lens", OSA/CLEO, May 1, 2011, pp. 1-2.

Pu et al.: "Efficient frequency comb generation in AlGaAs-on-insulator", Optica 3, 823 (2016).

Wong: "Next-Generation Broadband Access Networks and Technologies", JLT., 30 (4), 597, (2012).

Xiao et al.: "Millimeter Wave Communications for Future Mobile Networks", IEEE JSAC. 35 (9) 1909 (2017).

Search Report dated Oct. 15, 2018 in PCT/EP2018/073867 "Optical Line Terminal and Optical Fiber Access System With Increased Capacity" (4 pages).

International Preliminary Report on Patentability dated Mar. 19, 2020 in PCT/EP2018/073867 "Optical Line Terminal and Optical Fiber Access System With Increased Capacity" (9 pages).

European Search Report for EP Application No. 17189434.8, entitled "Optical Line Terminal and Optical Fiber Access System With Increased Capacity," dated Feb. 19, 2018, consisting of 7 pages.

U.S. Non-Final Office Action for U.S. Appl. No. 17/278,534, entitled "Optical Line Terminal And Optical Fiber Access System With Increased Capacity," dated Oct. 27, 2021.

Mulvad et al., "DWDM-to-OTDM Conversion by Time-Domain Optical Fourier Transformation", 2011, Proceedings of the European Conference on Optical Communication (ECOC) 2011, pp. 1-3 (Year: 2011).

Guan et al., "Ultra-high-speed all-channel serial-to-parallel conversion based on complete optical fourier transformation," Proceedings of 2016 Optical Fiber Communications Conference and Exhibition.

* cited by examiner

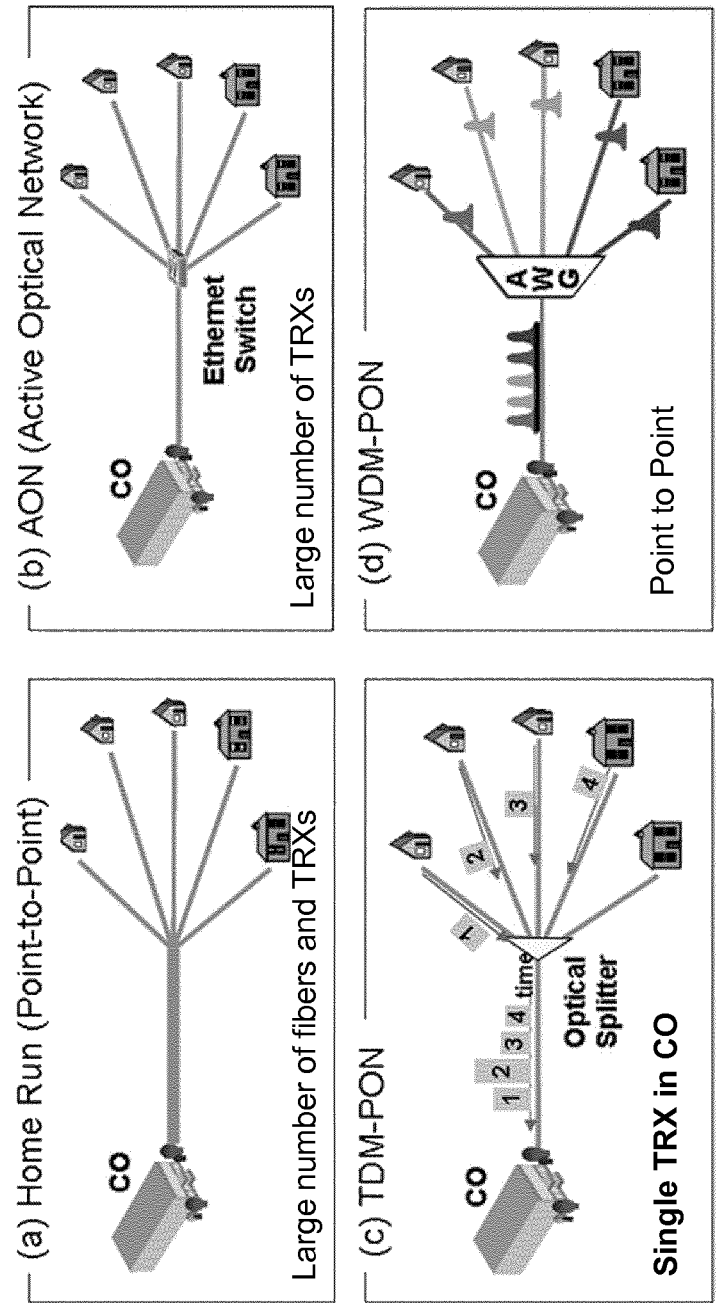
Fig. 1 – Prior art

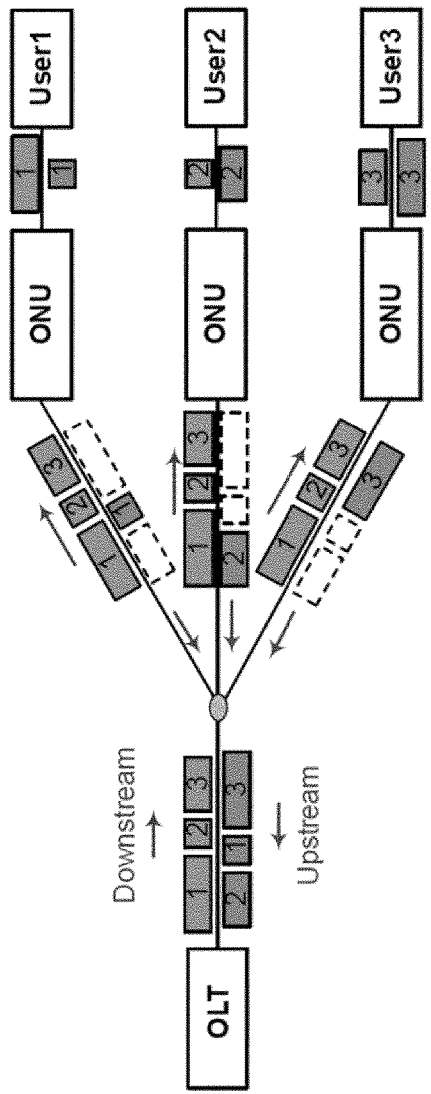
Fig. 2A – Prior art
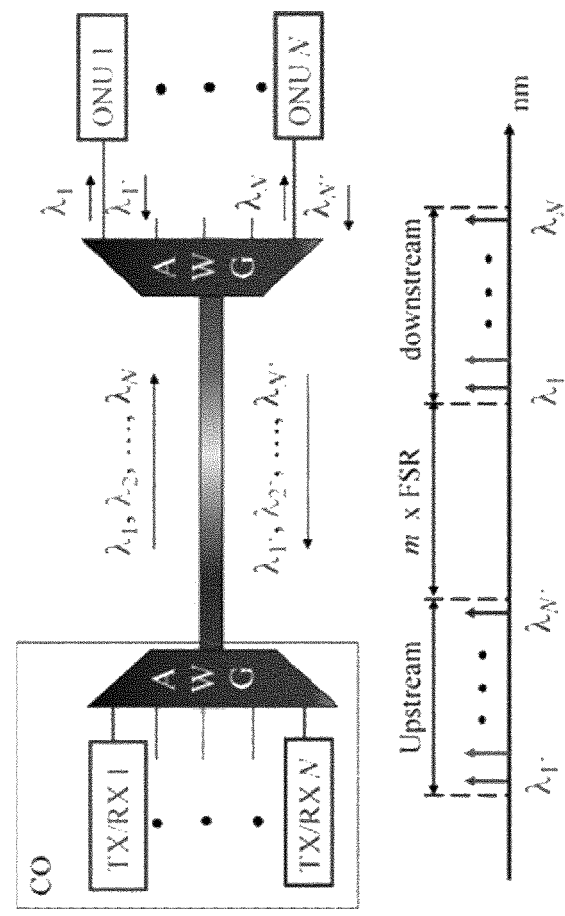
Fig. 2B – Prior art

OPTICAL LINE TERMINAL AND OPTICAL FIBER ACCESS SYSTEM WITH INCREASED CAPACITY

This application is the U.S. National Stage of International Application No. PCT/EP2018/073867, filed Sep. 5, 2018, which designates the U.S., published in English, and claims priority under 35 U.S.C. § 119 or 365(c) to European Application No. 17189434.8, filed Sep. 5, 2017. The entire teachings of the above applications are incorporated herein by reference.

The present disclosure relates to an optical line terminal that can be used in an optical fiber access system based on passive optical networks. The present disclosure further relates to a PON system with increased capacity and a method for increasing the capacity in a PON system.

BACKGROUND OF INVENTION

The incessant rise in data consumption by both fixed and mobile broadband subscribers drives continuous industry innovation to meet this challenge. Optical fiber access systems based on passive optical networks (PON) are currently being deployed on a mass market scale by numerous network operators. PON systems are often referred to as the "last mile" between an internet service provider and an individual user, i.e. PON systems are typically used to provide fiber to the end consumer, normally using a point-to-multipoint architecture, wherein unpowered fiber optic splitters can be used to enable a single optical fiber to serve multiple end-points. The end-points are often individual users rather than commercial distributors.

Passive optical networks are "passive" in the way the networks typically do not use electrically powered components to split the signal. Instead, the signal is distributed using beam splitters. Each splitter typically splits the signal from a single fiber into 16, 32, or up to 256 fibers, depending on the manufacturer, and several splitters can be aggregated in a single cabinet. A beam splitter cannot provide any switching or buffering capabilities and does not use any power supply. Passive optical networks have both advantages and disadvantages over active networks. The complexities involved in keeping electronic equipment operating outdoors can be avoided. PON systems also allow for analog broadcasts, which can simplify the delivery of analog television. However, because each signal must be pushed out to everyone served by the splitter the requirements to the single downstream transmitter in the central office are high. The drivers behind PON systems nowadays are therefore high reliability, low cost, and passive functionality.

A PON can be based on Time-Division Multiplexing (TDM) that implements a point-to-multipoint architecture wherein the single downstream transmitter, referred to in here as an Optical Line Terminal (OLT), transmits data frames to all connected Optical Network Units (ONUs) over a shared optical fiber network. ONUs only see their own data through the address labels embedded in the signal. In the upstream direction, the OLT schedules ONU transmissions to avoid collisions between ONUs. A passive optical splitter/combiner enables the fiber to be divided to reach multiple customer locations, thereby keeping the optical distribution network passive, cf. FIGS. 1 and 2 where prior art PON systems are illustrated.

Passive optical network is therefore becoming the dominating technology in optical fibre access systems and fiber-to-the-home. Even though optical fibers have large bandwidth, current PON technology will run out of capacity in 4-5 years due to:
  Growing number of subscribers
  Growing number of connected devices per subscriber
  Increasing bandwidth demands per device or application
  Increasing the serial bitrate beyond 10 Gb/s of PON systems is difficult due to lower dispersion tolerance and the lower signal to noise ratio (SNR). This limits the maximum reach in the C-band of the dispersion uncompensated 25 Gb/s PON to 24 km and of 40 Gb/s PON to 10 km even with the dispersion tolerance enhanced duo-binary modulation [2]. Recently, ITU-T defined the second next generation PON (NG-PON2) standard for PON beyond 40-Gb/s, in which time and wavelength division multiplexed (TWDM) PON has been considered as the primary solution. A baseline TWDM-PON with 40 Gb/s aggregate capacity over 60 km SMF has been demonstrated [3]. The key challenge for TWDM-PON is to realize its optical network unit (ONU) at low cost, the cost is predicted to be more than 20 times that of a standard GPON (Gigabit-PON) ONU [1]. Another competitive candidate for NG-PON2 is the point-to-point (P2P) WDM-PON based on wavelength splitter optical distribution network, which has unique features including long reach, high bandwidth, security, high service level guarantees, easy network management and simple upgrade [4]. A major disadvantage of P2P WDM-PON is the large port count, transmitters and terminations at the central office (CO) requiring more CO space and operational cost.

SUMMARY OF INVENTION

The present disclosure therefore presents a novel OLT structure and a novel passive optical network architecture that can drastically increase the transmission capacity of optical access systems. The novel architecture is based on the time-lens principle, i.e. time-lens optical signal processing (OSP). A time lens can expand and compress optical pulses while substantially retaining the temporal profile of the pulse. A time lens is based on the space-time duality of light: A quadratic phase modulation (PM) of a temporal waveform is analogous to the action of a thin lens on a spatial beam, hence the expression "time lens". By combining a time lens with suitable dispersion media an optical Fourier transformation (OFT) can be realized as exemplified herein. Time lens based OFT has further been shown to be a very versatile and powerful tool for ultrafast optical signal processing. It can be applied to transfer the temporal profile of an optical signal into the frequency domain and vice-versa. The presently disclosed principle is generally based on the idea of using a time-lens based optical signal processor for optical signal conversion between time division multiplexing (TDM) and wavelength division multiplexing (WDM)—and vice versa. The capacity can be further increased by using a time-lens based optical signal processor for optical signal conversion between M-wavelength TWDM and N-wavelength WDM signals, where M typically is less than N.

A first aspect of the present disclosure therefore relates to an optical line terminal for a passive optical network employing the presently disclosed OLT structure. I.e. comprising at least one transmitter for generating a time division multiplexed (TDM) downstream optical data signal, and a first time lens optical signal processor configured to convert the downstream TDM signal to a downstream WDM signal for distribution to a plurality of users. Typically at least one receiver for receiving and processing an upstream signal from said users is part of the OLT as well.

I.e. in a first embodiment the time-lens based optical processor converts the TDM signal generated in the OLT into a number of WDM channels, typically of low baud rate. These can be directly demultiplexed, e.g. by a conventional passive AWG, and send to individual Optical Network Units (ONU) on the user side with a low fixed loss, typically less than 4 dB loss. At the individual ONU side, the separated WDM channel can be received by a base rate receiver, resulting in much better receiver sensitivity, typically on the order of 10 dB for 32 subscribers. This can be achieved with even lower power consumption than hitherto known. The capacity of the time-lens PON can be further increased by introducing a WDM concept.

The presently disclosed application of the time lens principle might realize approx. 10 times more data rate on optical access communication network—more cost-efficient and energy-efficient than the prior art solutions. Point to multi-point, few point to multi-point and multi-point to multi-point schemes can be realized by applying the optical time-lens principle to PON systems.

In particular the presently disclosed OLT structure allows generation of a large number of WDM channels from a single TDM signal source, in fact the time-lens OFT approach for PON presented herein can be tuned such that all individual signals in a TDM signal can be converted to a specific wavelength in the WDM signal—and this can be provided over a broad wavelength interval, such as the entire C-band (1530 to 1565 nm), L-band (1565-1620 nm) or C+L-band or parts thereof. The frequencies of all the generated WDM channels can be frequency-locked with each other, and the frequency grid as well as the wavelength allocation can be tuned through the OFT without separate control of all the laser frequencies as in a conventional WDM PON, i.e. rather simply compared to conventional WDM PON.

A higher dispersion tolerance and larger power budget are also gained for long reach PON using the presently disclosed approach. With these advantages, 40-Gbit/s PON downstream transmission is demonstrated over 150 km 40-split unamplified SMF-plant with a single-carrier OOK transmitter and low-cost 10-GHz APD-based receiver, achieving a power budget of 51.5 dB (35.5 dB/ch.) for a BER=$3 \times 10^{-6}$, cf. example 1. Meanwhile, the same system achieves 128 Gb/s PON over 100-km 64-split unamplified fibre-plant using optical TDM technique, showing the high flexibility and scalability of the proposed scheme in terms of wavelength control and system throughput. The presently OLT structure and PON architecture is highly flexible in terms of wavelength allocation, as it allows tuning of the signal wavelength in sub nanoseconds by encoding (remapping) the TDM signal in time-domain, without tuning the actual wavelength of the optical source. And each individual signal in the TDM signal can be mapped to a specific wavelength in the WDM signal. The presently claimed invention can therefore not only increase the capacity of PON systems, but also have the flexibility of TDM-PON and the transmission performance of WDM-PON.

A further aspect of the present disclosure therefore relates to a passive optical network (PON) system comprising the optical line terminal disclosed herein.

Yet a further aspect relates to a method for generating a TDM optical signal and converting it to a downstream WDM optical signal using an optical time-lens as herein disclosed. E.g. a method for generating a downstream WDM optical signal for use in a passive optical network system, comprising the steps of generating a time division multiplexed (TDM) signal, and converting the TDM signal to a downstream wavelength division multiplexed (WDM) signal for distribution to a plurality of users in a passive optical network by means of a first time lens optical signal processor.

A further aspect of the present disclosure relates to a method for generating an upstream WDM optical signal and converting it to an upstream TDM optical signal using an optical time lens as herein disclosed. E.g. a method for receiving an upstream WDM optical signal distributed from a plurality of users in a passive optical network system, comprising the steps of converting the upstream WDM signal to a time division multiplexed (TDM) optical signal by means of a second time lens optical signal processor, and demultiplexing and processing the TDM signal to individual signals.

Yet a further aspect relates to a method for generating a downstream TDM optical signal to a WDM optical signal using an optical time-lens as herein disclosed. A further aspect of the present disclosure relates to a method for generating an upstream WDM optical signal to an upstream TDM optical signal using an optical time lens as herein disclosed.

DESCRIPTION OF DRAWINGS

FIGS. 1a-d show four examples of prior art optical access systems.

FIG. 2A shows an example of the architecture of a prior art TDM-PON system.

FIG. 2B shows an example of the architecture of a prior art WDM-PON system.

FIG. 17A shows the spectrum of the OFT output, FIG. 17B is a zoom-in on the idler, and FIG. 17C shows bit error rate (BER) performance with AlGaAs and HNLF of all 128 WDM channels at a fixed received power of −27 dBm for both B2B and 100 km transmission.

DETAILED DESCRIPTION OF THE INVENTION

Figure 3A:
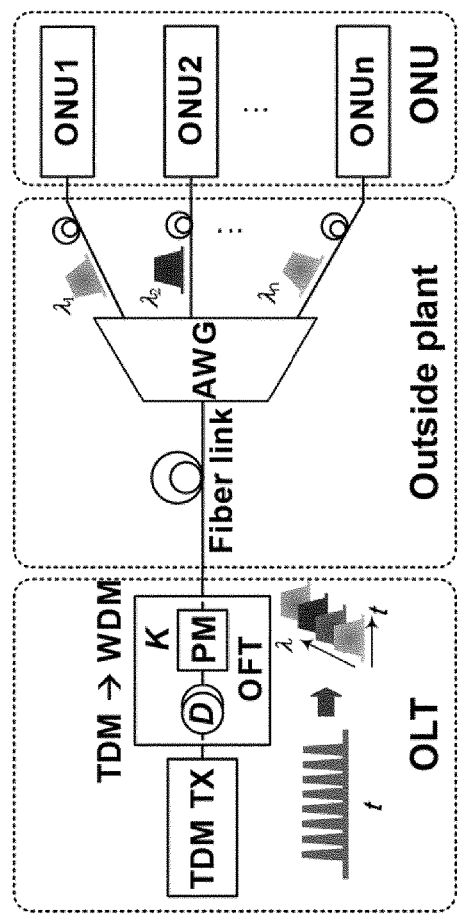
FIG. 3A shows a symmetric PON architecture according to one embodiment of the present disclosure with a D-K configuration of the time-lens processor.

A time-lens signal processing unit comprises a dispersive medium and a phase modulation stage, e.g. two phase modulation stages with an intermediate dispersion medium, a socalled K-D-K configuration. Another example is a dispersion medium and a single phase modulation stage, a socalled D-K or K-D configuration. A time-lens signal processing stage is an example of an optical Fourier transformation (OFT). A K-D-K configuration has for example been disclosed in WO 2015/131908. However, the K-D-K configuration cannot be directly applied when employing a time lens in a PON system as herein described. Instead, particular operating parameters and conditions must typically be introduced when employing a time lens in a PON system.

Time-Lens Principle

Just as a spatial optical imaging system can produce an image that is larger or smaller than the optical object, a time lens can be used to compress or expand an optical pulse. And as previously disclosed a time lens can expand and compress optical pulses while substantially retaining the temporal profile of the pulse. A time-lens was disclosed in U.S. Pat. No. 5,453,871 where a pulse compressor was presented that operated on a temporal pulse in a manner analogous to the operation of an optical imaging system.

The phase-modulation in the presently disclosed OFT (time-lens) module can be implemented by various means, for example by four-wave mixing (FWM), e.g. using chirped pump pulses. Four-wave mixing (FWM) can be obtained in a nonlinear optical element, wherein the nonlinear optical element is optically pumped with chirped pump pulses. The nonlinear optical element may for example be a highly nonlinear fiber (HNLF). Phase-modulation can also be obtained by cross-phase modulation (XPM) using parabolic intensity profile pump pulses, or electro-optic phase-modulation using an electrical driving signal. The FWM & XPM effects typically originate from the nonlinear optical Kerr effect, which is commonly used for nonlinear optical signal processing. The dispersion medium in the OFT units can be implemented by a standard fibre, such as a standard single mode fiber (SSMF) or a dispersion-compensation fibre (DCF), or a highly nonlinear fiber, or any other dispersive structure, such as Silicon-on-insulator waveguide platform. One example of the latter is an AlGaAs-on-insulator waveguide, for example a thin $Al_xGa_{1-x}As$ layer on top of a low index insulator layer residing on a semiconductor substrate. Wafer bonding and substrate removal can be used to realize the structure. The aluminium fraction (x) can for example be 17%, which makes the material bandgap 1.63 eV and the refractive index 3.33. Thanks to the large index contrast (~55%) of this layout, light can be confined in a sub-micron waveguide core. As the nonlinear parameter ($\gamma$) is highly dependent on the waveguide effective mode area ($A_{eff}$) as expressed by $\gamma = 2\pi_2/\lambda A_{eff}$, an ultra-high effective nonlinearity of about 660 $W^{-1}m^{-1}$, which is orders of magnitude higher than that of a typical $Si_3N_4$ waveguide, can be obtained for an AlGaAs-on-insulator waveguide using a cross-section dimension of 320 nm×630 nm [6,7].

Optical Line Terminal

As disclosed above a first aspect of the present disclosure relates to an optical line terminal for a passive optical network. An optical line terminal will typically comprise at least one transmitter, e.g. for generating a time division multiplexed (TDM) downstream optical data signal. A first time lens optical signal processor, i.e. an OFT element, can then be provided and configured to convert the downstream TDM signal to a downstream WDM signal, typically for distribution to a plurality of users. At least one receiver may be provided for receiving and processing an upstream signal from said users.

In a further embodiment a second time lens optical signal processor can be provided and configured to convert an upstream WDM signal received from said users to an upstream TDM signal. At least one TDM receiver can then be provided for demultiplexing and processing the upstream TDM signal. Alternatively at least one WDM receiver can be provided for demultiplexing an upstream WDM signal received from said users.

An optical splitter, such as a WDM coupler, can be provided for separating an upstream signal from said users/ONUs from the downstream WDM signal. At least one amplifier, e.g. an optical amplifier, such as an EDFA, can be provided for amplifying the downstream WDM signal and/or the upstream WDM signal. The downstream amplifier can be seen as a booster amplifier that boosts the WDM downstream signal before entering the transmission link. As demonstrated in example 1 herein, a 40 G PON system with an unamplified transmission distance of 150 km can be obtained. Likewise with the upstream signal that can be boosted after the transmission link and before the second time lens module that converts the WDM signal to a TDM signal.

In one embodiment of the present disclosure the first and/or the second time lens optical signal processor comprises two phase modulation stages, preferably quadratic phase modulation stages, separated by a dispersive medium in a K-D-K configuration. Preferably $\delta\varphi = K_1 t^2/2$ in the first phase modulation stage with linear chirp rate $K_1$, $\delta\varphi = K_2 t^2/2$ in second phase modulation stage with linear chirp rate $K_2$, and $D=\beta_2 L$ in the dispersion medium where $\beta_2$ is the $2^{nd}$ order dispersion and L is the length, such that $K_1=K_2=1/D$. The chirp rate K preferably determines the scaling factor between the time and frequency domains according to $\Delta t=2\pi\Delta f/K$.

In another embodiment of the present disclosure the first time lens optical signal processor comprises a dispersive medium with dispersion $D=\beta_2 L$ followed by a phase modulation element, preferably a quadratic phase modulation element, with chirp rate $K=1/D$. The second time lens optical signal processor advantageously then comprises a phase modulation element, preferably a quadratic phase modulation element, with chirp rate $K=1/D$ followed by a dispersive medium with dispersion $D=\beta_2 L$. I.e. a D-K configuration for the TDM to WDM conversion and preferably K-D configuration for the WDM to TDM conversion. Such configurations can simplify the time lens module, e.g. compared to the K-D-K configuration. The downside can be a small penalty on the capacity of the system.

The dispersive medium is a length of optical fiber, such as transmission fiber, such as a standard single mode fiber (SSMF), such as a dispersion compensating fibre (DCF), such as a highly nonlinear fiber. The phase modulation stage(s) may comprise(s) a length of highly non-linear fiber. In general the phase modulation can for example be based on four-wave mixing (FWM), e.g. using chirped pump pulses, cross-phase modulation (XPM) e.g. using parabolic intensity profile pump pulses, or electro-optic phase-modulation e.g. using an electrical driving signal.

A clock recovery unit may be provided and configured to synchronize the second time-lens signal processor to the upstream WDM signal. Further, the single channels of the upstream WDM signal may advantageously be symbol-wise synchronized at the input of the second time-lens optical signal processor. At least one control unit may be provided and connected to the transmitter and/or the receiver and configured to control the wavelength and timing of the signals.

In the few point to multipoint architecture the transmitter may comprise a multi-wavelength time and wavelength division multiplexed (TWDM) array configured to generate a time division multiplexed downstream optical signal at M different wavelengths, and where M is less than the number N of signal wavelengths in the downstream WDM signal. Correspondingly the receiver may comprise a multi-wavelength time and wavelength division multiplexed (TWDM) array configured to receive and process a time division multiplexed upstream optical signal at M different wavelengths.

In the asymmetric (few) point to multipoint architecture the receiver may advantageously be simplified and configured to receive and process a time division multiplexed upstream optical signal at a single wavelength.

Passive Optical Network System

A further aspect of the present disclosure relates to a passive optical network (PON) system comprising the optical line terminal as described herein. A PON system typically comprises an optical fiber infrastructure for distributing the downstream and upstream signals. Typically also at least one remote node for splitting the downstream WDM signal into separate wavelength signals, typically a passive remote node, i.e. without power supply, such as a passive AWG. The at least one remote node can then be configured for combining upstream separate wavelength signals into an upstream WDM signal. The remote node may comprise at least one arrayed waveguide grating (AWG) for splitting the downstream WDM signal into separate wavelength signals and/or for combining the upstream signals into a single WDM or TDM upstream signal.

In the symmetric point to multipoint or few point to multipoint architecture the presently disclosed PON system may further comprise separate ONU transmitters located at each user and configured to generate separate wavelength upstream signals that can be combined to a single (or few) upstream WDM signals.

In the asymmetric point to multipoint or few point to multipoint architecture the presently disclosed PON system may further comprise separate ONU transmitters located at each user configured to generate upstream signals at one predefined wavelength that can be combined to a single (or few) upstream TDM signal(s). In that case each network line between the remote node(s) and the separate ONUs may comprise a splitter, e.g. a WDM coupler, for separating the upstream signal at said predefined wavelength from the downstream separate wavelength signals.

Symmetric Point to Multi-Point

Figure 3B:
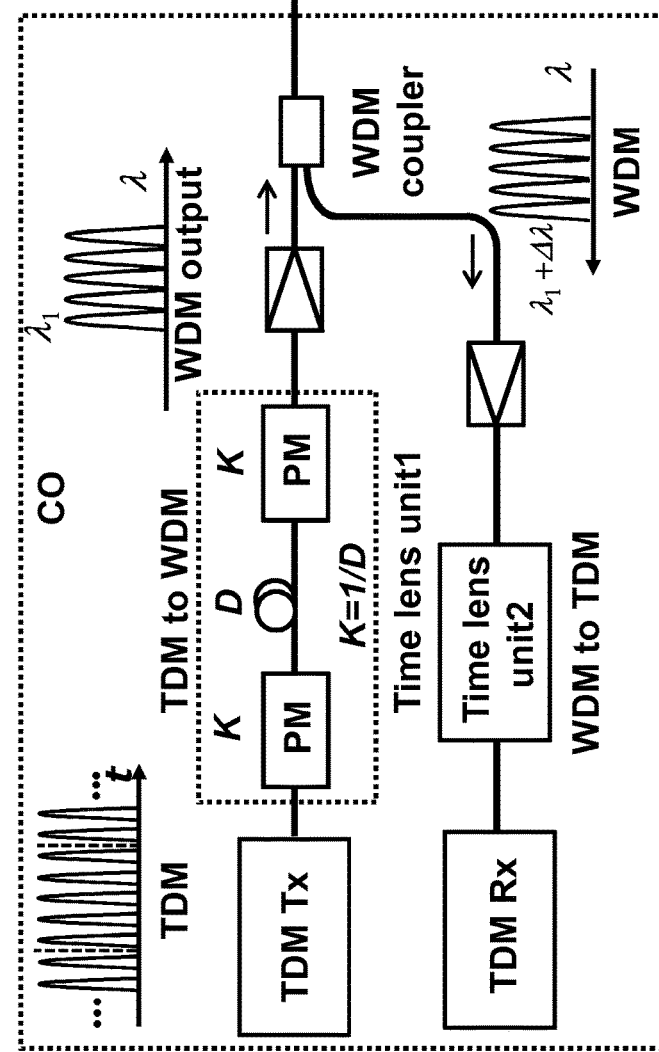
FIG. 3B shows a symmetric PON architecture according to one embodiment of the present disclosure with a K-D-K configuration of the time-lens processor.
Figure 4:
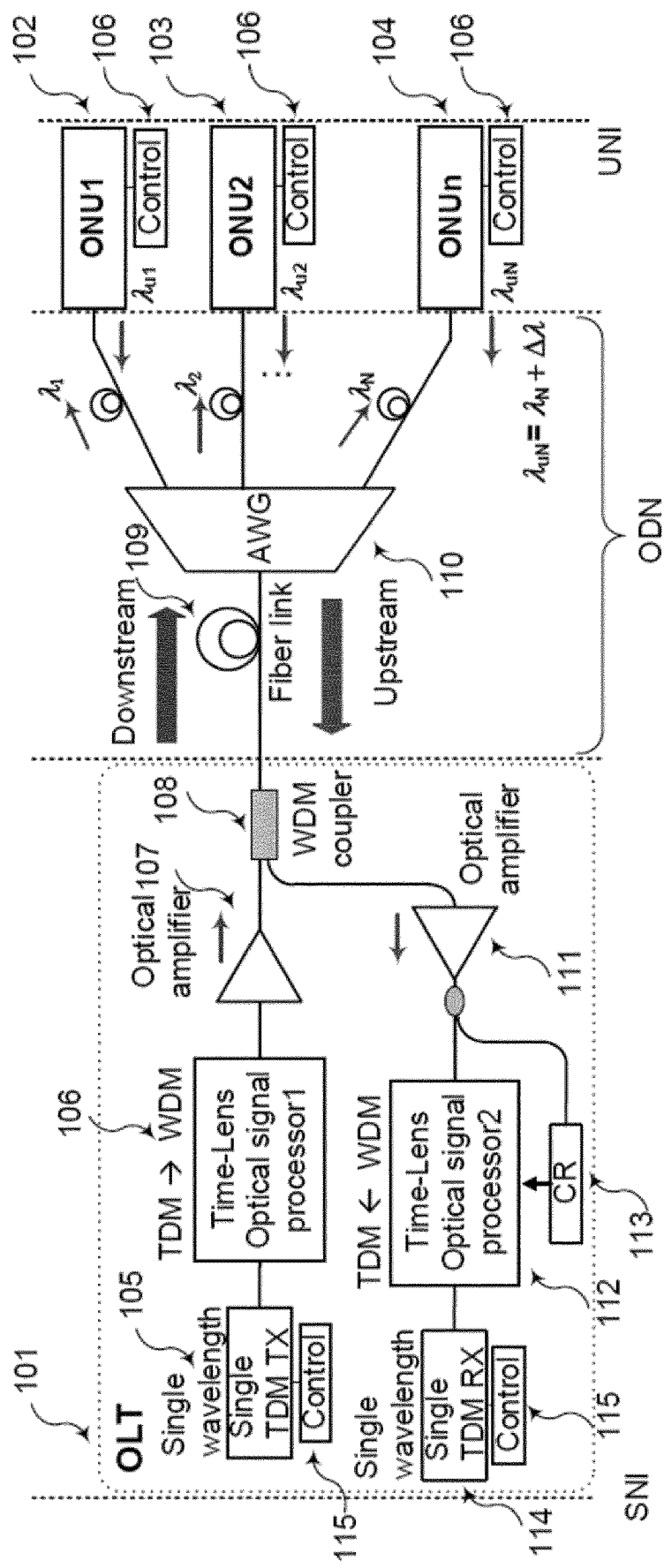
FIG. 4 shows a symmetric PON architecture according to one embodiment of the present disclosure. This architecture can offer the same total data rate for both downstream and upstream transmission.

FIGS. 3A, 3B and 4 show examples of the symmetric point to multi-point architecture. In the downstream data transmission in FIG. 4 the following symbols are used:

OLT (Optical Line Terminal): PON head-end, typically located in a central office ONU (Optical Network Unit): User side PON equipment ODN(Optical Distribution Network): Optical fiber infrastructure connecting OLT to ONUs SNI (Service Node Interface): Interface to the Metro/Core Network UNI (User Network Interface): Interface to the user network CR (Clock recovery): to synchronize the optical signal processor 2.

The data signals are transmitted from the OLT (101) to N ONUs (102,103,104). A TDM transmitter (105) generates a single wavelength high speed TDM optical data signal (201) with symbol rate $f_s$. The TDM optical data signal is converted to an N-wavelength ($\lambda_1, \lambda_2, \ldots, \lambda_n$) WDM signal (202) with channel spacing $\Delta v$ using a time-lens based optical signal processor (106). The converted N-wavelength WDM signal is amplified in the optical amplifier (107), and send further into a WDM coupler (108), which is used for separating the downstream and upstream signals in the OLT. A single strand fiber (109) is used for transmitting the WDM signal from the OLT to the remote node (RN) location, which is close to the ONUs. At the RN location, a passive periodic arrayed waveguide grating (AWG) (110) with wavelength channel spacing of $\Delta v$ is used for splitting the WDM signal to each ONU.

Figure 5:
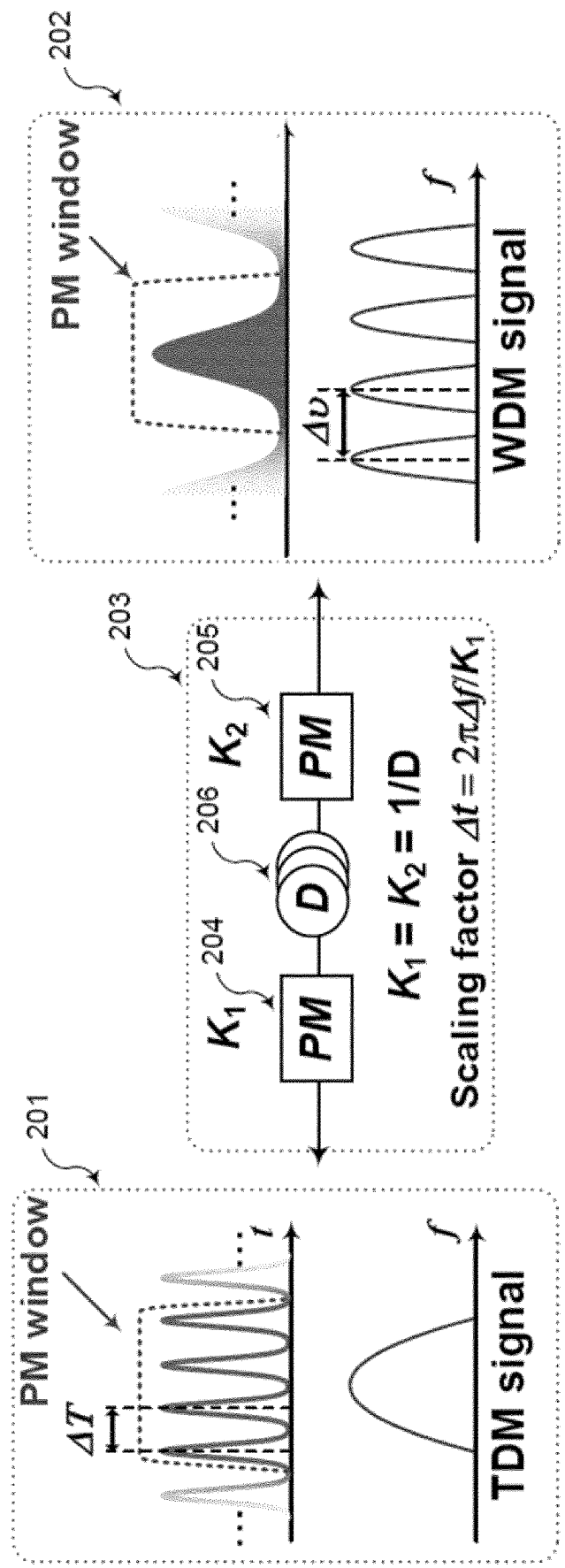
FIG. 5 exemplifies the presently disclosed principle of conversion between TDM and WDM signals in a point to multipoint architecture.

FIG. 5 illustrates and exemplifies the TDM (201) to N-wavelength WDM signal (202) conversion and vice-versa through the time lens signal processor (203). Here, $\Delta T$ is the symbol temporal spacing of the TDM signal, and $\Delta v$ is the WDM channel spacing of the converted WDM signal. The time lens optical signal processor for TDM to WDM conversion comprises two quadratic phase-modulation (PM) ($\Delta\varphi=Kt^2/2$) stages (204, 205) with linear chirp rate K, separated by a dispersion medium (206) of $D=\beta_2 L$ (where $\beta_2$ is the $2^{nd}$ order dispersion and L is the length), which satisfies the condition $K_1=K_2=1/D$, i.e. it is a K-D-K configuration. The chirp rate K determines the scaling factor between the time and frequency domains according to $\Delta t=2\pi\Delta f/K$. After the processor, the TDM signal is converted to a WDM signal with channel spacing $\Delta v$ depending on the choice of K. The repetition frequency of the quadratic phase-modulation $f_{PM}$ is set equal to $f_s/N$ for TDM to N-wavelength WDM signal conversion. The symbol rate of each WDM channel also equals $f_s/N$. The phase-modulation (PM) window is given by $T_{PM}=1/f_{PM}$. Note that the practical process may require a short guard interval (GI) between every N TDM symbols for the transition of the quadratic phase-modulation.

In the upstream data transmission, the transmitter at each ONU (102,103,104) generates an individual wavelength specific WDM channel ($\lambda_{u1}, \lambda_{u2}, \ldots, \lambda_{uN}$) that matches the transmission windows of the periodic AWG (110) at a different wavelength region according to $\lambda_{uN}=\lambda_N+\Delta\lambda$. The individual WDM channels are combined to an N-wavelength WDM signal at the AWG, and transmitted back to the OLT through the same optical fiber (109) at a different wavelength region. In the OLT, the upstream WDM signal is switched to the upstream RX using a WDM coupler (108). After pre-amplification (111), the WDM signal is converted to a TDM signal using another time-lens based optical signal processor 2 (112). FIG. 5 also illustrates the N-wavelength WDM (202) to TDM signal (201) conversion through the optical signal processor 2 (112). The components and settings in optical signal processors 1 (106) and 2 (112) are basically the same. A clock recovery unit (113) is used to synchronize the time-lens signal processor 2 (112) to the WDM signal. Finally, the converted TDM signal is received by a single TDM receiver (114). Note that for WDM to TDM conversion the WDM channels typically need to be symbol-wise synchronized at the input of the time-lens processor (112), control units (115,116) are used to control the wavelength and timing of the signal in both OLT and ONU sides. Furthermore, the total time-lens PON capacity can be further increased by using optical time-division multiplexing (OTDM) in the OLT.

Figure 14:
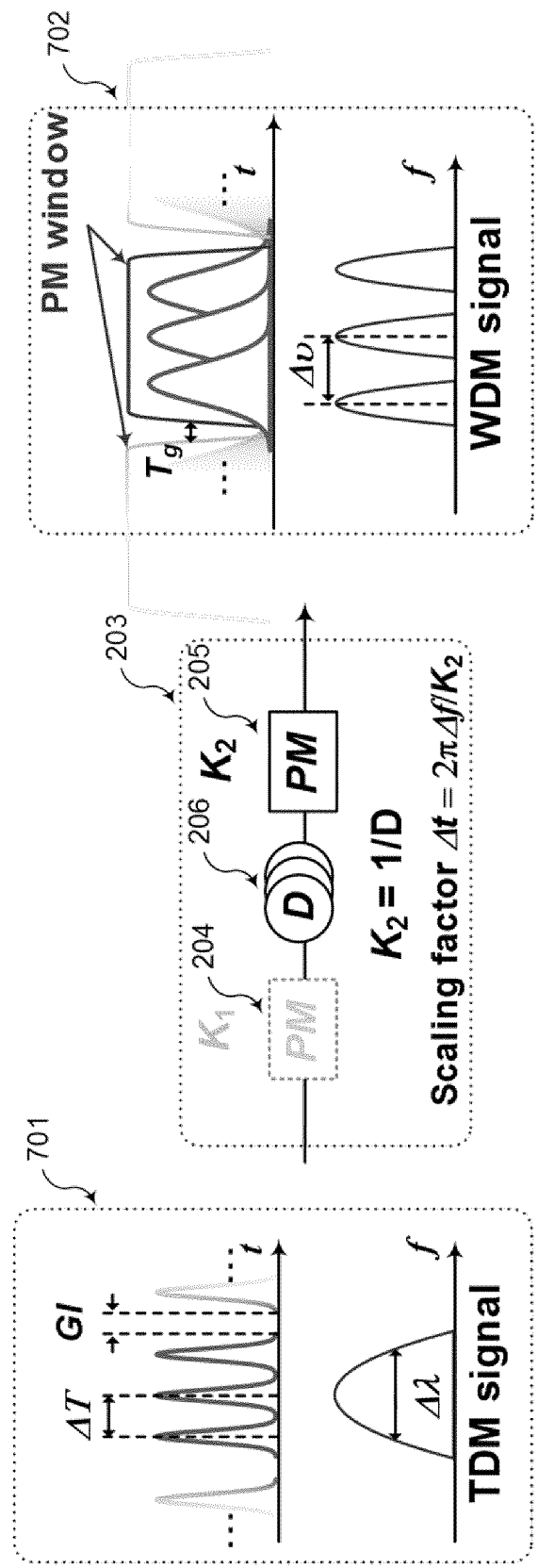
FIG. 14 shows another example of the presently disclosed principle of conversion between TDM and WDM signals in a point to multipoint architecture.

As stated previously the time-lens optical signal processor can be simplified from a K-D-K to a D-K configuration for TDM to WDM downstream conversion as exemplified in FIG. 14. In FIG. 14 this is illustrated by making the first phase modulation stage $K_1$ almost invisible. In case of a D-K downstream configuration it may be necessary to add a sufficient amount of guard interval (GI) in the time domain as illustrated to the left in FIG. 14. The amount of guard interval is related to signal bandwidth $\Delta\lambda$ dispersion D, and the gap between the PM windows $T_g$, according to $$GI \geq \frac{2\pi c}{\lambda^2} D\Delta\lambda + T_g$$

where c is the speed of the light, $\lambda$ is the signal wavelength. In the C-band from about 1530 to about 1565 nm this formula can be written as $$GI \geq 0.78 D\Delta\lambda + T_g$$

I.e. when a sufficient guard interval is provided to the signal periodically following the repetition frequency of the quadratic phase-modulation $f_{PM}$, the first quadratic phase-modulation stage can be omitted as shown in FIG. 14. However, adding a guard interval naturally reduces the data capacity of the system. I.e. it becomes a balance between cost and data capacity.

Figure 15:
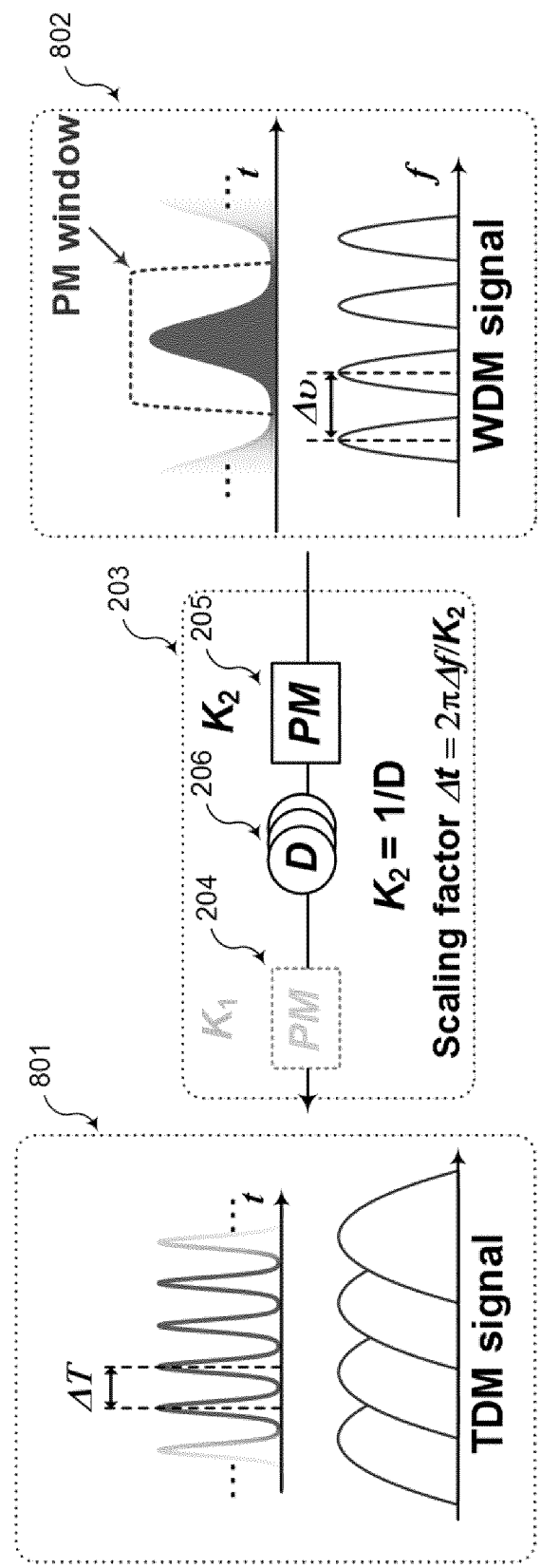
FIG. 15 shows another example of the presently disclosed principle of conversion between WDM and TDM signals in a point to multipoint architecture.

Upstream for WDM to TDM conversion the K-D-K configuration can also be simplified, in this case to a K-D configuration as exemplified in FIG. 15. In contrast to the guard interval for the downstream D-K configuration there are no limitations for the upstream K-D configuration and again $K_1$ can be omitted.

Symmetric Few Point to Multi-Point

Figure 6:
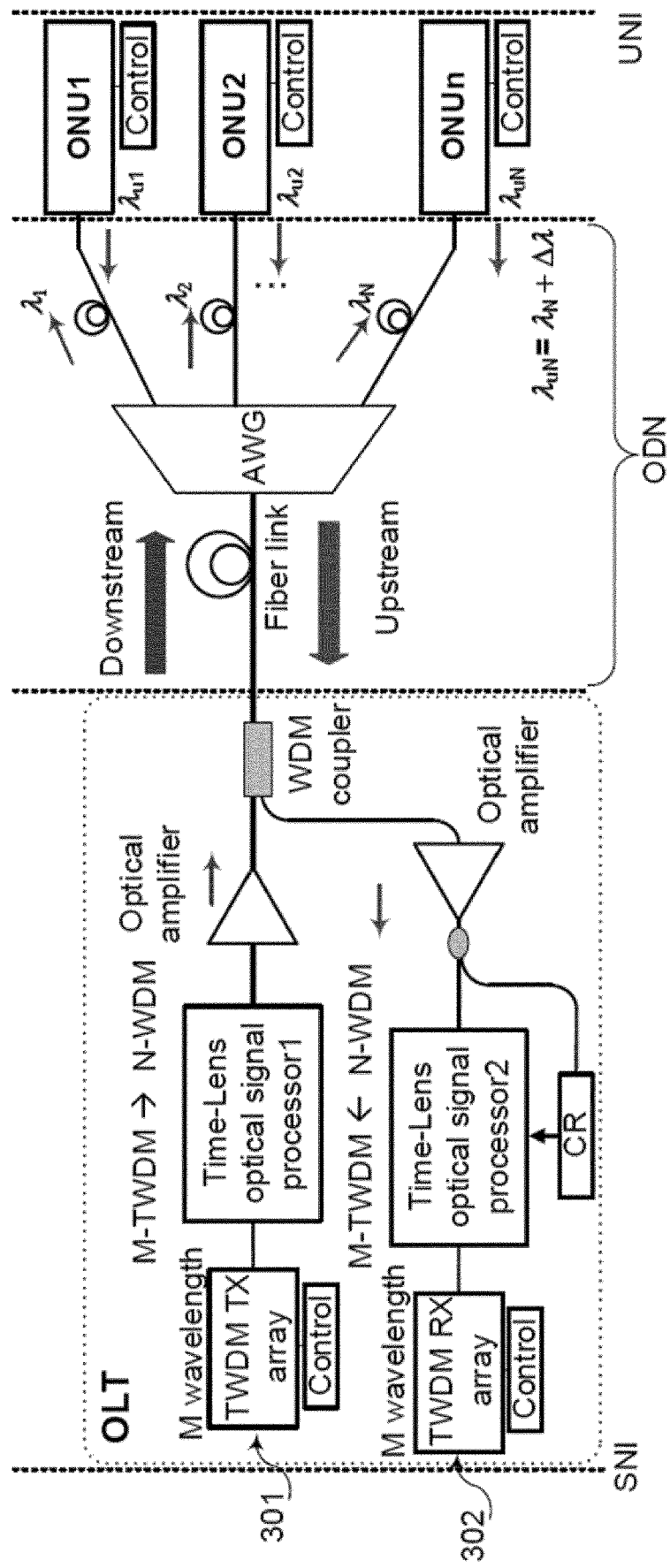
FIG. 6 exemplifies the few point to multipoint architecture as disclosed herein.
Figure 7:
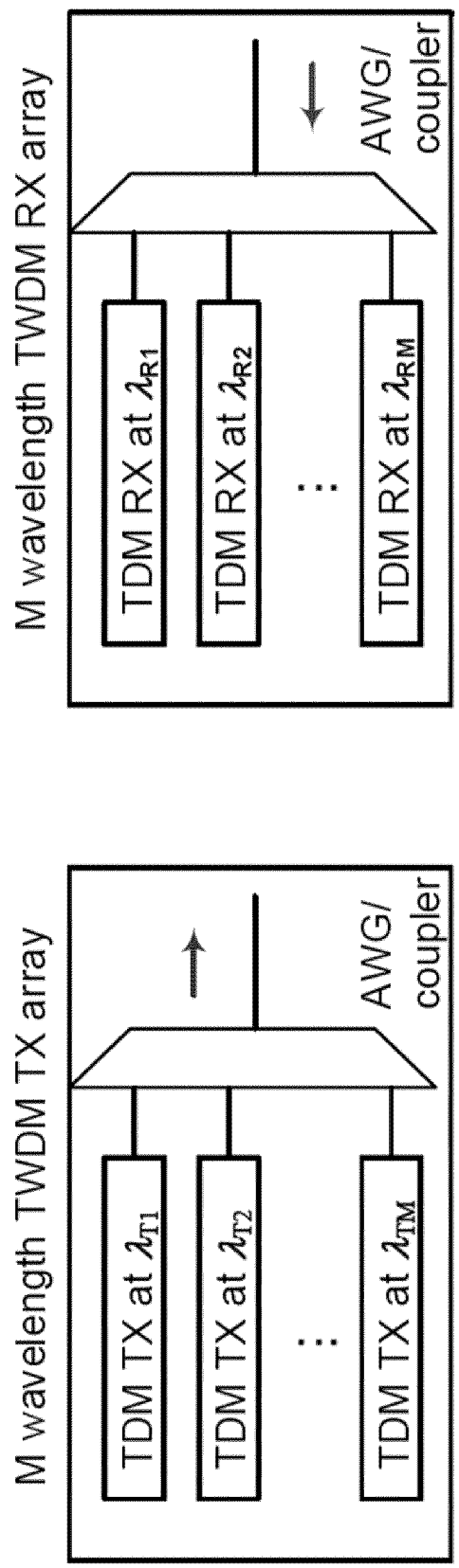
FIG. 7 illustrates M-wavelength TWDM TX array and RX array for use in the few point to multipoint architecture.

The capacity of the point to multi-point architecture can be further increased by a socalled symmetric few point to multipoint architecture as exemplified in FIG. 6. The main difference from the symmetric point to multipoint time-lens PON architecture disclosed above is that a single wavelength TDM TX and RX in the OLT is replaced by the multi-wavelength TWDM TX array (301) and RX array (302) having a multiple M of wavelengths. However, the number M of wavelengths is typically much less than the ONU counts N. This few point to multipoint architecture can increase the total time-lens PON capacity by a factor M, by simply adding TDM TRX at different wavelengths in the OLT. M wavelength TWDM TX array and RX array are exemplified in FIG. 7. At the ONU side, the individual ONU obtains increased bit rate at the original wavelength, without the requirement of a WDM TRX array.

Figure 8:
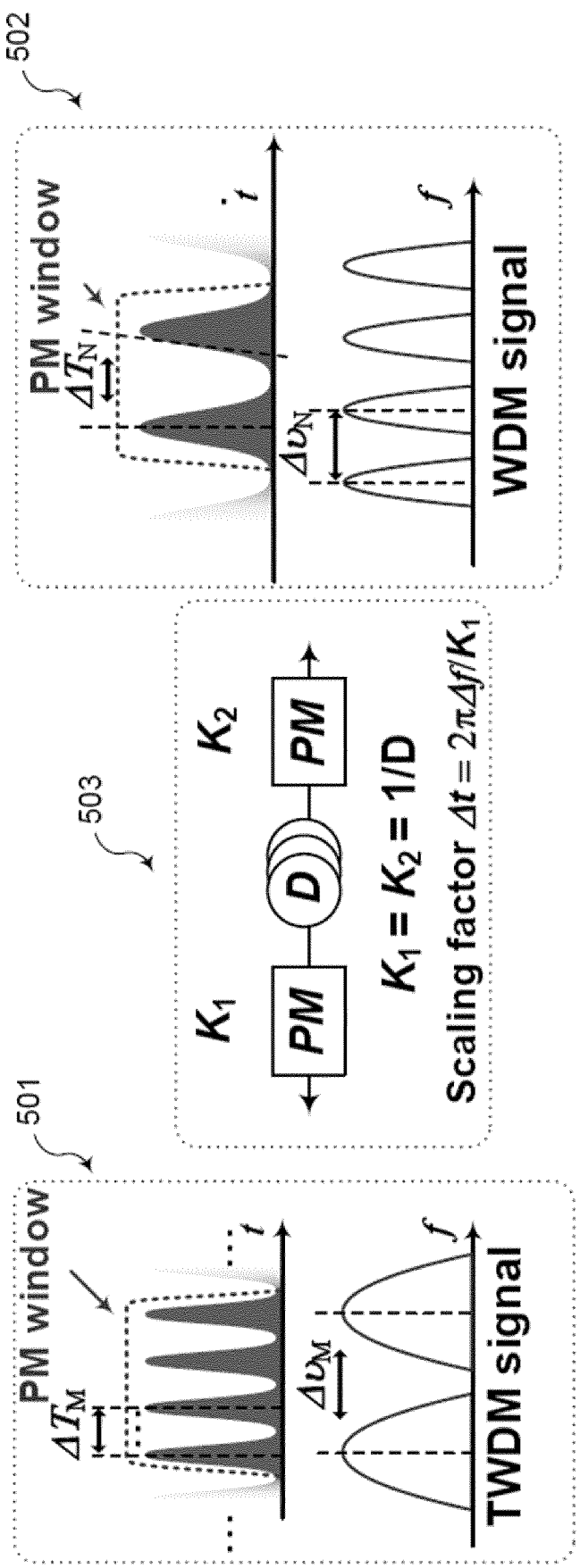
FIG. 8 illustrates the principle of conversion that can be applied in the few point to multipoint architecture.

FIG. 8 illustrates the M-wavelength TWDM (501) to N-wavelength WDM signal (502) (M to N) conversion and vice versa (N to M conversion) through the time-lens signal processor (503). For M-TWDM to N-WDM conversion, the symbol rate of the TWDM signal is $f_s$, and the repetition frequency of the quadratic phase-modulation $f_{PM}$ is set to $f_s/N$. The M-wavelength TWDM signal is converted to a N-wavelength WDM signal with channel spacing $\Delta v_N$, depending on the choice of K, which also determines the M-TWDM channel spacing $\Delta v_M$. The symbol rate of the each converted WDM channel is multiplexed by M, which is $Mf_s/N$. The components and settings for both M-TWDM to N-WDM and N-WDM to M-TWDM can basically be the same.

Asymmetric Point to Multi-point and Few Point to Multipoint

Figure 9:
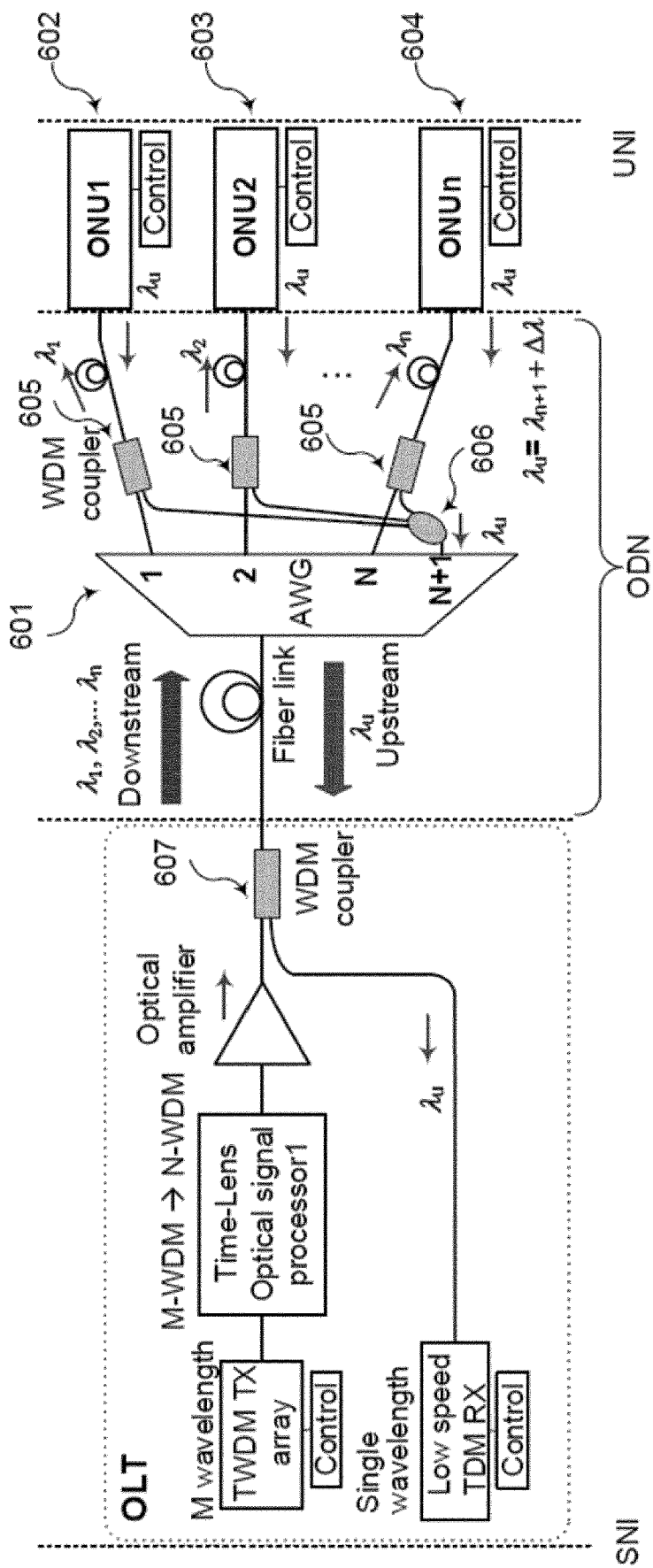
FIG. 9 exemplifies the asymmetric (few) point to multi-point architecture as disclosed herein.

Some access networks require larger capacity for the downstream transmission than for the upstream transmission. In that case an asymmetric PON architecture in which the total upstream data rate is less than the downstream data rate can be suitable. An example is illustrated in FIG. 9. This embodiment combines the time-lens PON and traditional TDM PON, where the time-lens PON architecture is used for the high capacity demand of the downstream transmission, while the traditional TDM PON is used for the less demanding upstream transmission. The downstream part can be similar to the symmetric point to multipoint and few point to multipoint as described above. The AWG (601) in the ODN has N+1 ports, where port 1 to N are used for downstream transmission, and the last port (N+1) is used only for upstream transmission. In the upstream part, the transmitter at each ONU (602, 603, 604) generates TDM channels at the same $\lambda_u$ that matches the transmission windows of the periodic AWG port no. N+1 at a different wavelength region according to $\lambda_{uN+1}=\lambda_{N+1}+\Delta\lambda$. At the remote node (RN) location, the upstream signals are separated by N WDM couplers (605), and combined to the AWG port no. N+1 by an N to 1 optical combiner (606). The TDM signal is transmitted back to the OLT through the same optical fiber at $\lambda_{uN+1}$. In the OLT, the upstream TDM signal is switched to the upstream RX using a WDM coupler (607).

Advantages of Time-Lens PON

FIG. 1 shows four examples a)-d) of prior art optical access systems where c) and d) show PON systems. FIG. 1(a) is point to point system that requires a large number of optical fibers and transmitters. FIG. 1(b) shows an active optical network that requires a large number of transmitters. FIG. 1(c) is an example of a TDM-PON system that is a cost-efficient solution because only a single transmitter is required in the central office (CO). The TDM-PON principle is illustrated in further detail in FIG. 2A. The WDM-PON system illustrated in FIG. 1(d) is a point to point system with many technical advantages but this is not a cost-efficient solution. The WDM-PON principle is illustrated in further detail in FIG. 2B. Compared to these prior art solutions there are a number of advantages of time-lens PON:

Single (or few) transmitter(s) in central office (CO): Less cost and energy consumption, i.e. one of the advantages of existing TDM PON is maintained in time-lens PON.

Splitting loss is small and independent of the number of subscribers: In a conventional PON system, the use of passive optical splitter/combiner introduces a ~10 Log N [dB] splitting loss depending on the subscriber count N, which severely limits the user counts. In contrast to this, in the time-lens PON the optical splitter can be replaced, for example by a conventional passive AWG, with a much lower fixed loss (<4 dB) regardless of the number of subscribers. This allows for efficient scale up of the amount of users.

No subscriber count N dependent SNR penalty: In a conventional PON system the OLT broadcasts the TDM signal to all ONUs. The actual signal power is therefore only 1/N of the total received power at each ONU. The larger integrated noise bandwidth also brings noise. This results in a SNR penalty proportional to $N^2 \sim N^3$. In contrast hereto each ONU only receives its own signal at the base bandwidth in time-lens PON. Hence, there is no subscriber count dependent SNR penalty in time-lens PON, resulting in much better receiver sensitivity, e.g. ~10 dB better than that of prior art TDM-PON with 32 users.

Better power budget: The reduced splitting loss and better receiver sensitivity result in a larger power budget of time-lens PON compared to prior art PON. The enhanced power budget is furthermore independent of the subscriber count. The enhanced power budget can be used to scale up the total capacity, user count and transmission reach efficiently.

No extra bandwidth requirement on the components at the ONU side: In a conventional PON system, the transceivers at the ONU side require a bandwidth which is tens of times of the actual used data rate. Upgrade of such a system requires a large amount of optoelectronic devices with even higher bandwidth for all ONUs—this is costly and results in higher energy consumption. In the presently disclosed time-lens PON, there is no extra bandwidth requirement, allowing re-use of the existing devices on the ONU side for tens of times more data capacity, which is more cost- and energy-efficient than the other prior art high capacity PON solutions.

No security issues: Prior art PON systems require data encryption, since each ONU has access to all the data sent to any of the other users on the PON. In the presently disclosed time-lens PON, a wavelength demultiplexer (e.g. an AWG) at the RN directs a different wavelength to each user. Thus, there are no security issues since users on the time-lens PON do not have access to any of the other downstream wavelengths. Hence, security is guaranteed by the architecture of the physical network.

Dispersion tolerance: Conventional PON systems transmit high speed TDM signal in the fiber link, which has poor dispersion tolerance—and the dispersion tolerance will become worse and worse when the speed of the TDM signal increases. The presently disclosed time-lens PON transmits low speed WDM signals in the fiber link, which has better dispersion tolerance than prior art PON systems.

No Quality of Service (QoS) issues related to sharing the PON: When bandwidth demand becomes high in prior art PON systems it can lead to QoS issues, e.g. how to fairly assign capacity to multiple high-demand users. This may lead to a requirement of larger buffer memories for users waiting to send data and issues regarding time delays and packet loss. In the presently disclosed time-lens PON, there is no issue regarding QoS or privacy, since no optical signals are shared with anyone else connected to the time-lens PON. Even at the internet rush hour, the user experience is guaranteed.

The advantages listed above can be summarized as follows:

| Feature | Prior art PON | Time-lens PON |
|---|---|---|
| TRX count in CO | 1 | 1 (or few) |
| Splitting loss | 10logN [dB] | <5 dB |
| SNR Penalty | $N^2 \sim N^3$ | Reference |
| Receiver sensitivity for 32 users | ~−10 dB | Reference |
| Security | No | Yes |
| Bandwidth at ONU | N x subscriber data rate | Subscriber data rate |
| Power budget | Small | Large |
| Dispersion tolerance | Bad | Good |
| QoS | Priority management | No issue |

Example 1

The presently disclosed time-lens PON approach has been demonstrated experimentally. A 40-Gbit/s PON downstream transmission over 150-km 40-split unamplified SMF-plant has been obtained with a single-carrier OOK transmitter and low-cost 10-GHz APD-based receiver, achieving a power budget of 51.5 dB (35.5 dB/ch.) for a BER=$3 \times 10^{-6}$. Meanwhile, the same system achieves 128 Gb/s PON over 100 km 64 split unamplified Fiber-Plant using optical TDM technique, showing flexibility and scalability of the presently disclosed scheme in terms of wavelength control and system capacity.

Principle and Experimental Setup

One example of the presently disclosed OLT structure/PON architecture is shown in FIG. 3A and this setup is used here in example 1. In the optical line terminal (OLT), a single carrier TDM transmitter generates a high-speed TDM signal, which is then converted to a number of low-speed WDM channels using a time-lens based OFT signal processor, which comprises a dispersive medium with dispersion $D=/\beta_2 L$, followed by a quadratic phase modulation with chirp rate K=1/D. The converted WDM signal is transmitted through the wavelength splitter based outside plant, e.g. using an arrayed waveguide grating (AWG). At the ONU side, each ONU receives its own specific wavelength channel using low-speed components. Unlike transmitting a high speed TDM signal through a power splitter based outside plant, the proposed OLT structure inherits advances from WDM-PON, e.g. higher dispersion tolerance, lower splitting loss, better receiver sensitivity, longer reach, security, and guaranteed quality of service but requires only one transmitter at the OLT and offers more flexibility and scalability.

Figure 10:
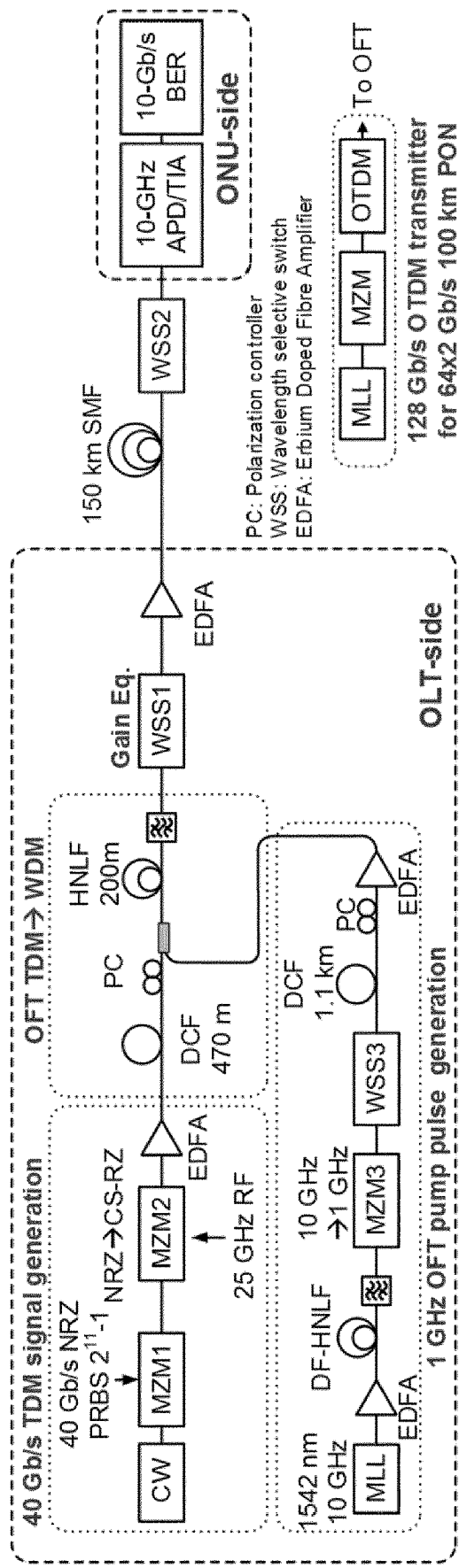
FIG. 10 illustrates the experimental setup of example 1 with 40 G P2MP PON over 150 km 40-split unamplified fiber-plant using time lens.

The experimental setup is shown in FIG. 10. The output of an external cavity CW laser at 1581.5 nm is NRZ on-off keying (OOK) modulated in a Mach-Zehnder modulator (MZM). The data pattern used for modulation consists of 40× 1-Gb/s $2^{11}$-1 PRBS TDM tributaries and 200-ps guard interval (GI) between every 40 TDM tributaries for OFT operation. A second MZM is used to carve the NRZ signal into a carrier-suppressed return-to-zero (CS-RZ) signal resulting in the 40 Gb/s CSRZ OOK signal with guard interval, as show in FIG. 11(a), which can be directly converted to individual WDM channels using OFT without any further optical filtering. At the OFT, the obtained 40

Figure 11:
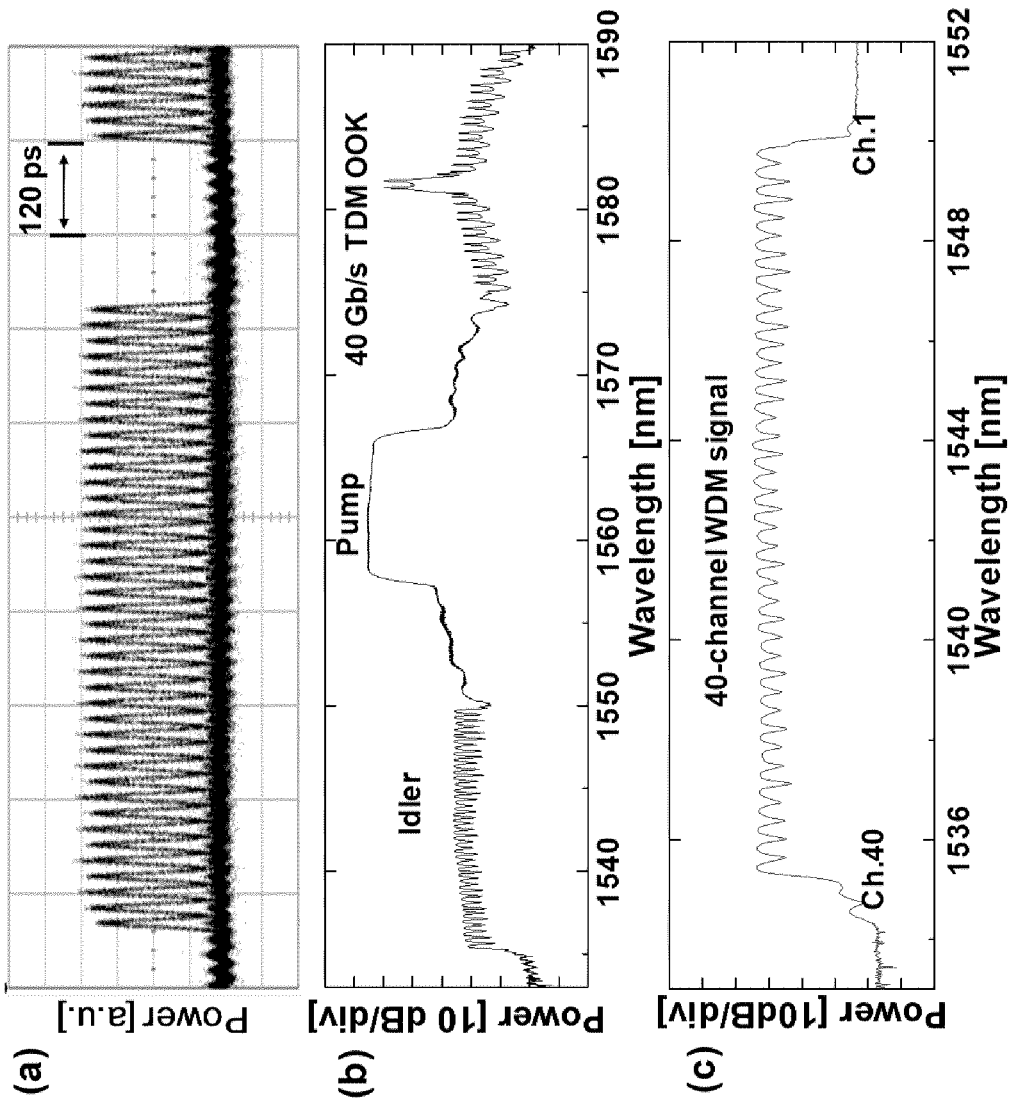
FIG. 11a shows a waveform of the 40 Gb/s TDM CS-RZ-OOK signal.
FIG. 11b shows a spectrum of the OFT output.
FIG. 11c shows the 40-channel WDM signal obtained after power equalization.

Gb/s TDM signal is firstly dispersed in 470 m dispersion compensation fiber (DCF). The quadratic phase modulation is implemented based on a four-wave mixing (FWM) process in a highly nonlinear fibre (HNLF) using linearly chirped rectangular pump pulses. The source of pump pulses is a 10-GHz mode-locked laser (MLL) at 1542 nm, which are spectrally broadened in 400 m HNLF. A MZM is used to decrease the repetition rate of the MLL to 1-GHz, to enable the OFT operating at 1 GHz. The OFT pump is obtained by filtering the broadened spectrum in a wavelength selective switch (WSS3) and propagation in 1.1 km dispersion compensation fiber (DCF). The chirp rate K=0.014 $ps^{-2}$ is set for conversion of 20 ps temporal spacing to 46 GHz frequency grid. The resulting spectrum is shown in FIG. 11(b). The generated idler is the 40-channel WDM signal converted from the 40-Gb/s TDM signal. After extraction with an optical bandpass filter, the power levels of the generated WDM channels are equalized in WSS1. The spectrum of the 40-channel WDM signal after power equalization is shown in FIG. 11(c), where 40 1-Gb/s WDM channels with 46 GHz spacing are observed. The WDM signal obtained is optically boosted to 21.5 dBm (5.5 dBm/ch.) using an erbium doped fibre amplifier (EDFA), and launched into a 150 km unamplified SMF fibre link. The wavelength splitter is implemented by another WSS. In the ONU, each spitted WDM channel is directly received by a low-cost 10-GHz APD/TIA based receiver.

Experimental Results

Figure 12:
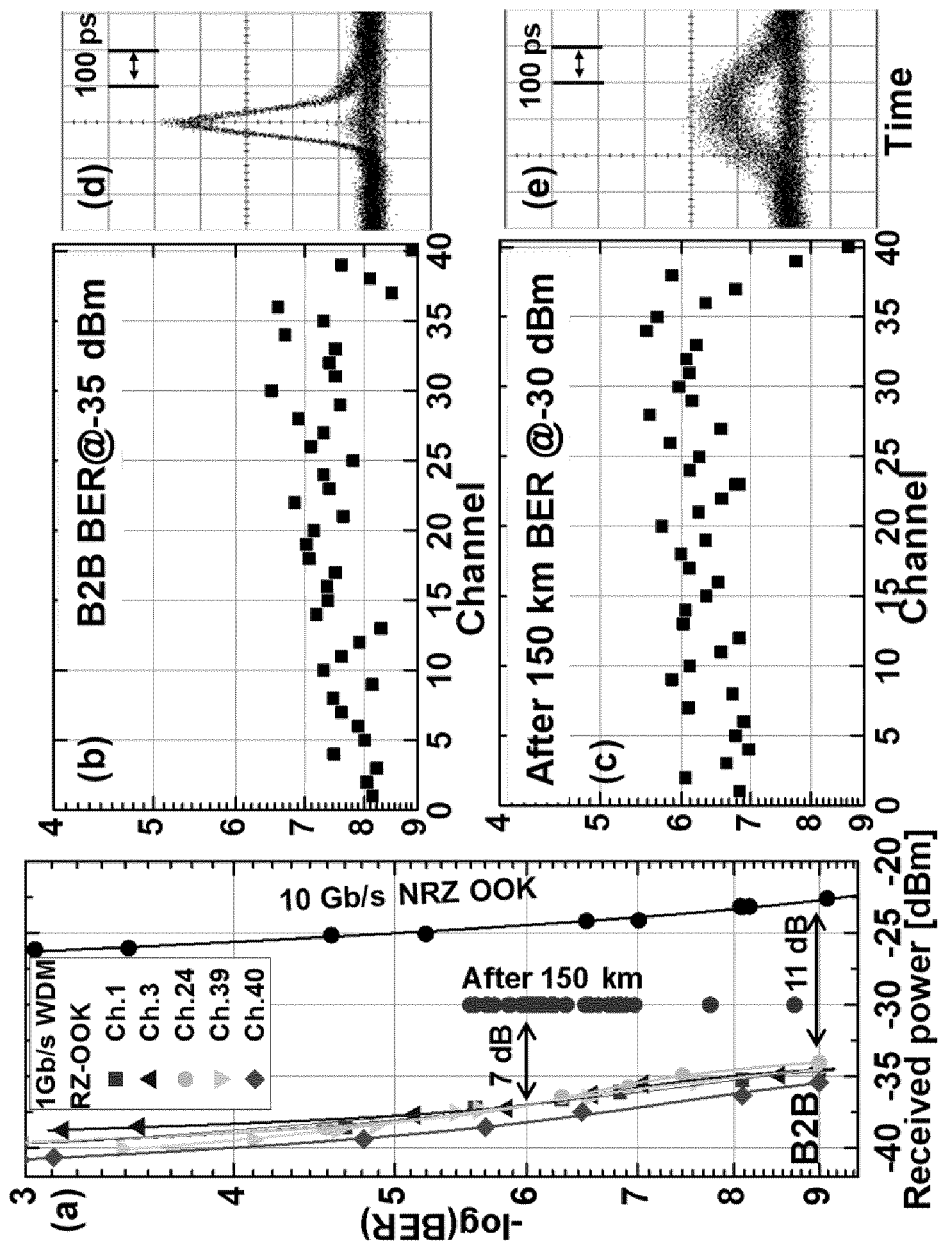
FIG. 12a shows B2B BER performance of some selected WDM channels.
FIG. 12b shows all channel BER performance before 150 km SSMF transmission.
FIG. 12c shows all channel BER performance after 150 km SSMF transmission.
FIG. 12d shows the waveform of WDM channel no. 20 before transmission.
FIG. 12e shows the waveform of WDM channel no. 20 after transmission.

FIG. 12(a) shows the back-to-back (B2B) BER performance of some selected 1-Gb/s RZ-OOK WDM channels after TDM to WDM conversion. For reference, a 10-Gb/s NRZ-OOK baseline BER curve using the same APD is also shown. 11 dB better receiver sensitivity is gained at BER=$10^{-9}$ from the APD based receiver, when receiving lower symbol rate RZ signals. The BER performance of all 40 WDM channels before transmission at a fixed received power of −35 dBm is shown in FIG. 4(b), and the BER after 150 km transmission without re-amplification or dispersion compensation at −30 dBm is shown in FIG. 12(c). After 150 km transmission, all converted WDM channels achieve BER<$3\times10^{-6}$, i.e. well below the forward error-correcting (FEC) threshold of BER=$10^{-3}$, indicating a BER of $10^{-12}$ can be achieved for all WDM channels after error correction. The BER fluctuations between WDM channels which can be observed both before and after the transmission, are due to the inter-channel-interference (ICI) introduced at the OFT, from the intersymbol interference of the TDM signal. The BER of the edge channels are better due to less ICI. The power penalty after 150 km transmission is ~7 dB. This is due to the fibre nonlinearity and the dispersion during the transmission, which can be observed from the waveform of a WDM channel before, cf. FIG. 12(d), and after the transmission, cf. FIG. 12(e). The power budget is 51.5 dB (35.5 dB/ch) for a BER=$3\times10^{-6}$ after 150 km transmission.

Flexibility and Scalability

Figure 13:
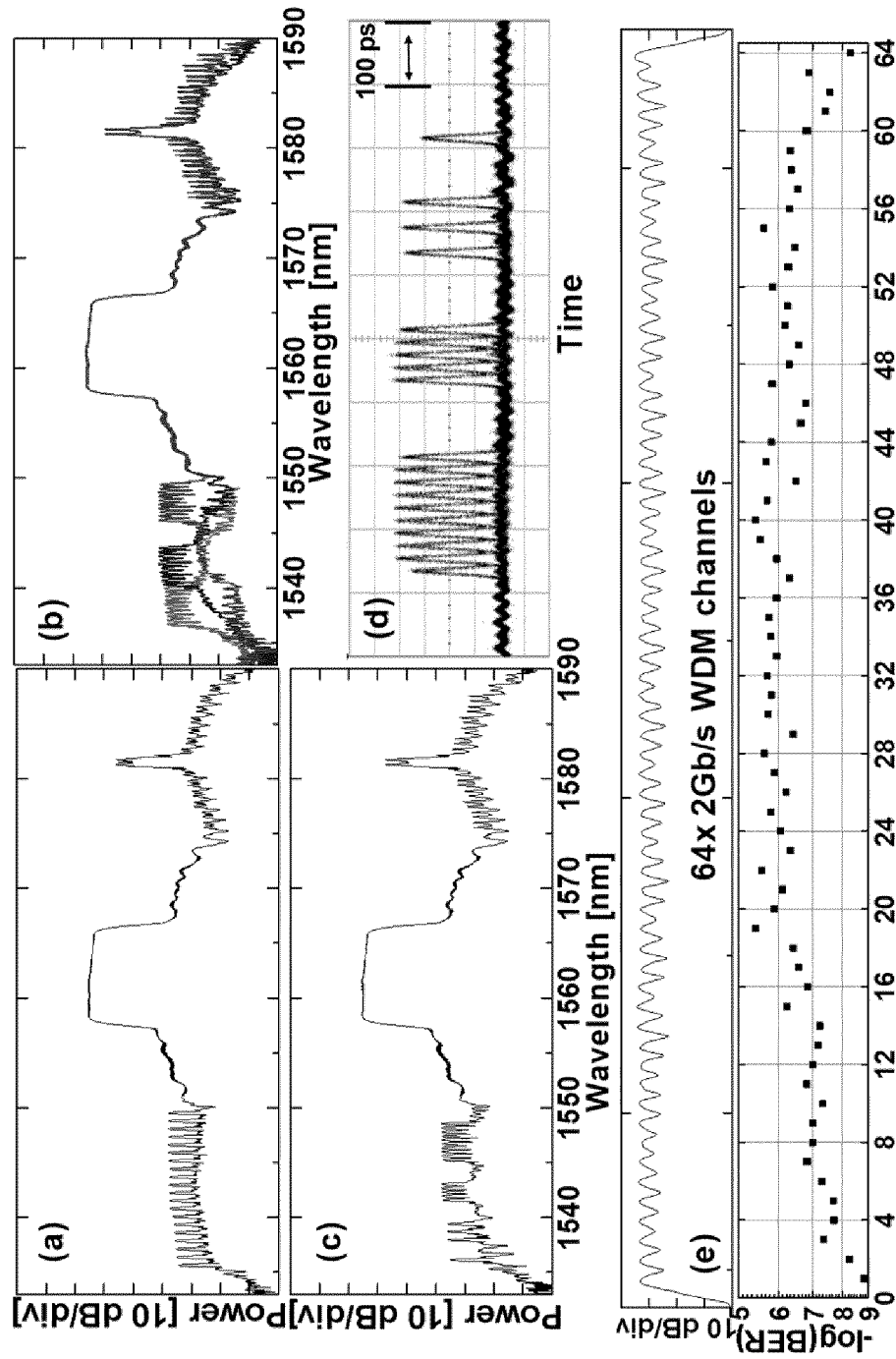
FIG. 13a shows 20-channel WDM signal.
FIG. 13b shows wavelength allocation of a 10-channel WDM signal.
FIG. 13c shows a designed WDM signal.
FIG. 13d shows the TDM waveform before OFT.
FIG. 13e shows converted spectrum of the 64×2 Gb/s WDM spectrum and it's all channel BER performance after 100 km.

The proposed OLT structure/PON architecture is highly flexible in terms of wavelength allocation, as the OFT allows tuning of the signal wavelength in sub nanoseconds by encoding (remapping) the TDM signal in time-domain, without tuning the actual wavelength of the optical source. As shown in FIG. 13, with OFT and the TDM signal encoding, a 20-channel WDM signal with 92 GHz spacing can be realized by turning off every second TDM tributaries (FIG. 13(a)). FIG. 13(b) shows the wavelength allocation of a 10-channel WDM signal using OFT, which can reduce the complexity for wavelength alignments of the WDM channels to the AWG ports. FIG. 13(c) shows a designed OFT output, which is obtained by encoding the TDM signal as shown in FIG. 13(d), indicating that the proposed scheme is highly flexible in terms of WDM channel count, channel spacing and their wavelength allocation. Furthermore, the same system is also used to achieve 128 Gb/s PON over 100 km 64 split unamplified fibre-plant using optical TDM technique. The setup of the OTDM transmitter is shown in FIG. 10, where the output of the MLL is OOK data modulated to 8 Gb/s and then OTDM to 128 Gb/s using a fibre delay line based OTDM multiplexer. The spectrum of the OFT converted 64×2 Gb/s WDM signal with 37 GHz frequency grid and all channel BER performance after 100 km are shown in FIG. 13(e), where all converted WDM channels achieve a BER<$5\times10^{-6}$ showing the flexibility and scalability of the presently disclosed principle.

Hence, a highly flexible and scalable OLT structure for WDM-PON using OFT has been verified experimentally. A long-reach 40-Gb/s PON transmission over 150-km 40-split unamplified fibre-plant was successfully demonstrated with a single OOK transmitter and low-cost 10-GHz APD-based receiver.

Example 2

In this example the scalability of the presently disclosed solution is investigated and 128×2 Gb/s WDM PON downstream transmission over a 100-km unamplified SMF-plant is demonstrated using a 200 m highly nonlinear fiber (HNLF, for example from OFS). Although all 128 generated WDM channels achieve BERs below the $10^{-3}$ forward error-correction (FEC) limit after transmission, a bandwidth limitation of the HNLF is observed, which will limit the scalability of the proposed scheme. To overcome this issue the use of AlGaAs-on-insulator (AlGaAsOI) nonlinear waveguides [6,7] for implementing the time lens is investigated. The same 128×2 Gb/s WDM PON system using an AlGaAs device is demonstrated, which achieves similar performance as HNLF, but without showing indications of having reached a bandwidth limitation.

Principle and Experimental Setup

The principle is the same as shown in FIG. 3a. In the OLT, a single TDM transmitter generates a high-speed TDM signal, which is then converted to a number of lower-speed WDM channels using a time-lens based OFT signal processor, composed of a dispersive medium followed by a quadratic phase modulator. The generated WDM signals are transmitted through a wavelength-splitting outside plant using e.g. an arrayed waveguide grating (AWG). Then, each ONU receives its own specific wavelength channel using low-speed components. To demonstrate the scalability, we constructed a TDM transmitter capable of providing very high TDM rates, although a standard commercial e/o-TDM transmitter can be used for more practical systems addressing 40-60 Gb/s total rates.

Figure 16:
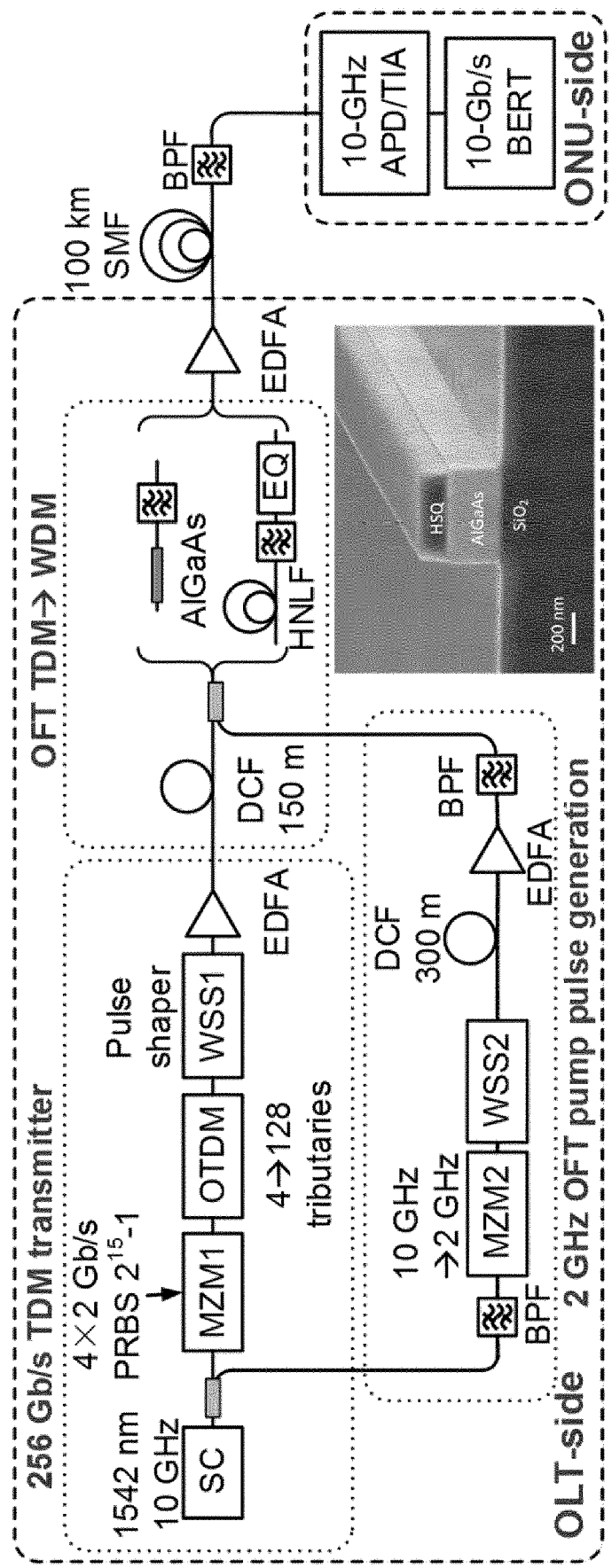
FIG. 16 shows the experimental setup used in example 2 with 128×2 Gb/s WDM PON over 100 km unamplified fiber-plant. The inset is a picture of an AlGaAs-on-insulator waveguide.

The experimental setup is shown in FIG. 16. The output of a 10 GHz supercontinuum (SC) source is on-off keying modulated (MZM1) with 4×2-Gb/s $2^{15}$-1 PRBS TDM tributaries. The output is further optical time-division multiplexed (OTDM) to 128×2-Gb/s using a fiber based OTDM multiplexer. A 100-ps guard interval is added between every 128 TDM tributaries for OFT operation. A wavelength selective switch (WSS1) carves the signal into a 1.2 ps Gaussian shape with a 38% duty cycle. This signal is directly converted to individual WDM channels using OFT, based on four-wave mixing (FWM) in a highly nonlinear device using linearly chirped rectangular pump pulses. The AlGaAs nanowire is a dispersion engineered straight 4 mm long AlGaAsOI waveguide, which includes tapering sections for low loss interfacing with tapered optical fibers. The main waveguide section is ~3 mm long and the total insertion loss is 6 dB. The HNLF has a length of 200 m, non-linear coefficient γ~10 $W^{-1}km^{-1}$, zero-dispersion wavelength ~1560 nm and dispersion slope 0.005 ps/(nm²·km) [8]. The pump pulses are generated from the same SC source followed by MZM2, which is used to decrease the repetition rate to 2 GHz for OFT operation. The OFT pump is obtained by filtering in WSS2 followed by 300 m DCF propagation to map the 3.125-ps TDM tributary spacing on a 25-GHz frequency grid. The optimized input power to the AlGaAs waveguide is 22.0 dBm for the pump and 13.4 dBm for the OTDM signal, and the optimized input power to the HNLF is 19.5 dBm and 11 dBm, respectively. After OFT, the generated 128×2-Gb/s WDM channels are boosted to 21 dBm using an EDFA, and launched into a 100 km unamplified SMF fiber link. After transmission, a tunable bandpass filter (BPF) is used to select the individual WDM channels, one at a time, to be directly detected by an APD/TIA receiver.

Figure 17:
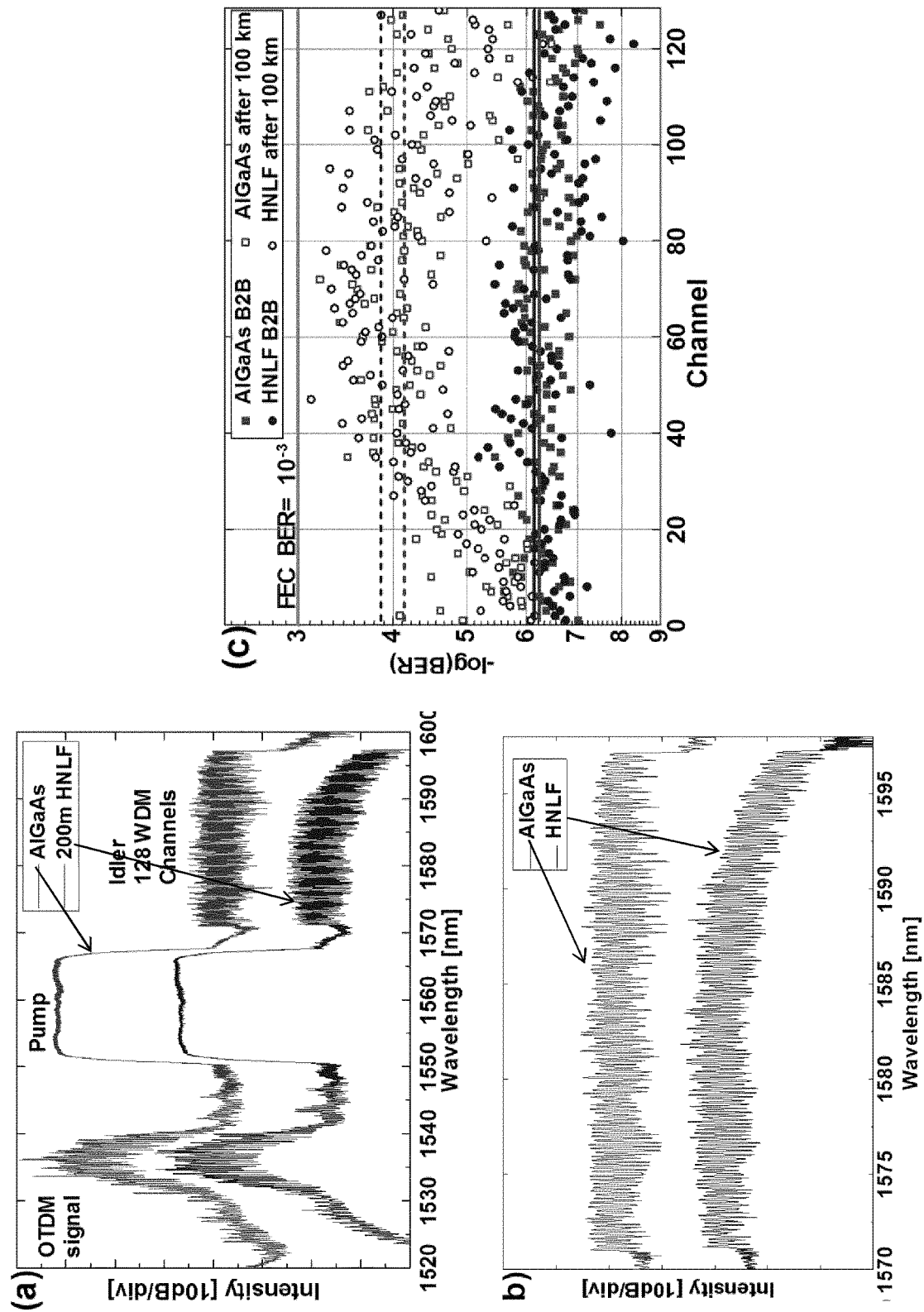
FIGS. 17A-C show the experimental results in example 2 comparing the use of a HNLF and an AlGaAs-on-insulator waveguide as the dispersive medium in a time-lens.

The experimental results are shown in FIGS. 17A-C. The output spectra with HNLF and AlGaAs device are shown in FIG. 17A with the AlGaAs device spectrum on top and the HNLF in the bottom.

HNLF

The FWM idler consists of 128 WDM channels at 2 Gb/s each. A zoom-in on the idler is shown in FIG. 17B, in which the Fourier transformation of the 256 Gb/s Gaussian OTDM signal to 128 individual WDM channels with 25 GHz spacing, can be observed. However, the power difference between the short and long wavelength channels is more than 15 dB as shown in FIGS. 17A and 17B. This is due to the limited nonlinear operational bandwidth of the HNLF, requiring additional equalization before transmission. With power equalization using a wavelength selective switch, all 128 WDM channels after 100 km transmission achieve BERs below the FEC limit at BER=$10^{-3}$, as shown in FIG. 17C.

AlGaAs Device

The power difference between the individual channels is less than 3 dB as shown in FIG. 17B. After 100 km transmission, all 128 WDM channels achieve BERs<$10^{-3}$, as shown in FIG. 17C. The average BER values before (solid line) and after transmission (dashed line) with the AlGaAs waveguide are similar to that with the HNLF. For both HNLF and AlGaAs, BER<$10^{-3}$ is obtained for all 128 WDM channels after transmission, although it is difficult for HNLF to scale to higher channel counts, due to the limited operational bandwidth. In contrast, the AlGaAs waveguide shows a greater potential for further scaling of the channel count.

CONCLUSION

A 128×2-Gb/s WDM-PON system with 100 km unamplified transmission based on a single TDM time lens source is demonstrated with both an AlGaAs waveguide and a HNLF. All 128 converted WDM channels achieve BERs below the $10^{-3}$ FEC threshold after transmission in both cases, which confirms the high scalability of the proposed scheme. The experimental results show that the AlGaAs waveguide has potential for further scaling of the subscriber count and of the total capacity of the proposed OLT structure.

REFERENCES

[1] D. Nesset, "PON roadmap [invited]," IEEE J. Opt. Commun. 9 (1), A71, (2017).

[2] V. Houtsma et al., "A Study of Options for High-Speed TDM-PON Beyond 10G," JLT, 35 (4), 1059, (2017).

[3] Y. Luo et al. "Time- and Wavelength-Division Multiplexed Passive Optical Network (TWDM-PON) for Next-Generation PON Stage 2 (NG-PON2)." JLT, 31(4), 587, (2013).

[4] E. Wong, "Next-Generation Broadband Access Networks and Technologies." JLT., 30 (4), 597, (2012).

[5] P. Guan et al., "Time lens based optical Fourier transformation for all-optical signal processing of spectrally-efficient data," JLT, 35 (4), 799, (2017).

[6] M. Pu et al., Optica 3, 823 (2016).

[7] L. Ottaviano et al., Opt. Letters 41, 3996 (2016).

ITEMS

Further details of the present disclosure are provided in the following items.

1. An optical line terminal for a passive optical network, comprising
   at least one transmitter for generating a time division multiplexed (TDM) downstream optical data signal,
   a first time lens optical signal processor configured to convert the downstream TDM signal to a downstream WDM signal for distribution to a plurality of users, and
   at least one receiver for receiving and processing an upstream signal from said users.
2. The optical line terminal according to item 1, further comprising a second time lens optical signal processor configured to convert an upstream WDM signal received from said users to an upstream TDM signal, and at least one TDM receiver for demultiplexing and processing the upstream TDM signal.
3. The optical line terminal according to any of the preceding items, further comprising at least one WDM receiver for demultiplexing an upstream WDM signal received from said users.
4. The optical line terminal according to any of the preceding items, further comprising at least one WDM coupler for separating an upstream signal from said users from the downstream WDM signal.
5. The optical line terminal according to any of the preceding items, further comprising at least one optical amplifier for amplifying the downstream WDM signal and/or the upstream WDM signal.
6. The optical line terminal according to any of the preceding items, wherein the first time lens optical signal processor comprises a dispersive medium with dispersion D=$\beta_2$L followed by a phase modulation element, preferably a quadratic phase modulation element, with chirp rate K=1/D.
7. The optical line terminal according to any of the preceding items 6, wherein a predefined minimum amount of guard interval is provided in the time domain of the downstream TDM signal.
8. The optical line terminal according to any of the preceding items 7, wherein the predefined minimum amount of guard interval is related to the signal bandwidth Δλ, the dispersion D, and the gap between the PM windows $T_g$, according to $$GI \geq \frac{2\pi c}{\lambda^2} D\Delta\lambda + T_g$$

where c is the speed of the light and λ is the signal wavelength.

9. The optical line terminal according to any of the preceding items, wherein the second time lens optical signal processor comprises a phase modulation element, preferably a quadratic phase modulation element, with chirp rate K=1/D followed by a dispersive medium with dispersion D=$\beta_2$L.

10. The optical line terminal according to any of the preceding items, wherein the first and/or the second time lens optical signal processor comprises two phase modulation stages, preferably quadratic phase modulation stages, separated by a dispersive medium in a K-D-K configuration.

11. The optical line terminal according to any of the preceding items 10, wherein $\delta\varphi=K_1 t^2/2$ in the first phase modulation stage with linear chirp rate $K_1$, $\delta\varphi=K_2 t^2/2$ in second phase modulation stage with linear chirp rate $K_2$, and wherein D=$\beta_2$L in the dispersion medium where $\beta_2$ is the $2^{nd}$ order dispersion and L is the length, such that $K_1=K_2=1/D$.

12. The optical line terminal according to any of the preceding items 10-11, wherein the chirp rate K determines the scaling factor between the time and frequency domains according to $\Delta t = 2\pi \Delta f/K$.

13. The optical line terminal according to any of the preceding items 6-12, wherein the dispersive medium is a length of optical fiber, such as transmission fiber, such as a standard single mode fiber (SSMF), such as a dispersion compensating fibre (DCF).

14. The optical line terminal according to any of the preceding items 6-13, wherein the phase modulation stage(s) comprise(s) a length of highly non-linear fiber.

15. The optical line terminal according to any of the preceding items 6-14, wherein the phase modulation stage(s) comprise(s) at least one AlGaAs-on-insulator waveguide.

16. The optical line terminal according to any of the preceding items 6-15, wherein the phase modulation is based on four-wave mixing (FWM), e.g. using chirped pump pulses, cross-phase modulation (XPM) e.g. using parabolic intensity profile pump pulses, or electro-optic phase-modulation e.g. using an electrical driving signal.

17. The optical line terminal according to any of the preceding items, further comprising a clock recovery unit configured to synchronize the second time-lens signal processor to the upstream WDM signal.

18. The optical line terminal according to any of the preceding items, wherein the single channels of the upstream WDM signal are symbol-wise synchronized at the input of the second time-lens optical signal processor.

19. The optical line terminal according to any of the preceding items, further comprising at least one control unit connected to the transmitter and/or the receiver and configured to control the wavelength and timing of the signals.

20. The optical line terminal according to any of the preceding items, wherein the transmitter comprises a multi-wavelength time and wavelength division multiplexed (TWDM) array configured to generate a time division multiplexed downstream optical signal at M different wavelengths, and where M is less than the number N of signal wavelengths in the downstream WDM signal.

21. The optical line terminal according to any of the preceding items 20, wherein the receiver comprises a multi-wavelength time and wavelength division multiplexed (TWDM) array configured to receive and process a time division multiplexed upstream optical signal at M different wavelengths.

22. The optical line terminal according to any of the preceding items, wherein the receiver is configured to receive and process a time division multiplexed upstream optical signal at a single wavelength.

23. A passive optical network (PON) system comprising the optical line terminal according to any of the preceding items.

24. The PON system according to item 23, further comprising
an optical fiber infrastructure for distributing the downstream and upstream signals,
at least one remote node for splitting the downstream WDM signal into separate wavelength signals.

25. The PON system according to any of preceding items 23-24, wherein the at least one remote node is configured for combining upstream separate wavelength signals into an upstream WDM signal.

26. The PON system according to any of preceding items 23-25, further comprising separate ONU transmitters located at each user configured to generate separate wavelength upstream signals that can be combined to a single (or few) upstream WDM signals.

27. The PON system according to any of preceding items 23-26, further comprising separate ONU transmitters located at each user configured to generate upstream signals at one predefined wavelength that can be combined to a single (or few) upstream TDM signals.

28. The PON system according to any of preceding items 23-27, wherein the each network line between the remote node(s) and the separate ONUs comprises a splitter for separating the upstream signal at said predefined wavelength from the downstream separate wavelength signals.

29. The PON system according to any of preceding items 23-28, wherein the remote node comprises at least one arrayed waveguide grating (AWG) for splitting the downstream WDM signal into separate wavelength signals and/or for combining the upstream signals into a single WDM or TDM upstream signal.

30. A method for generating a downstream WDM optical signal for use in a passive optical network system, comprising the steps of
generating a time division multiplexed (TDM) signal, and
converting the TDM signal to a downstream wavelength division multiplexed (WDM) signal for distribution to a plurality of users in a passive optical network by means of a first time lens optical signal processor.

31. A method for receiving an upstream WDM optical signal distributed from a plurality of users in a passive optical network system, comprising the steps of
converting the upstream WDM signal to a time division multiplexed (TDM) optical signal by means of a second time lens optical signal processor, and
demultiplexing and processing the TDM signal to individual signals.

32. The method according to any of items 30-31 employing any of the features employed in items 1-29.

What is claimed is:

1. An optical line terminal for a passive optical network, comprising
    at least one transmitter at the optical line terminal of the passive optical network, the transmitter configured to generate a time division multiplexed (TDM) downstream optical data signal comprising a number of channels that are separated in time t with separation $\Delta t$,
    a first time lens optical signal processor at the optical line terminal, the first time lens optical signal processor comprising two phase modulation stages with chirp rate $K=1/D$ separated by a dispersive medium with dispersion $D=\beta_2 L$ in a K-D-K configuration, wherein $\beta_2$ is the $2^{nd}$ order dispersion and L is the length of the dispersive medium, such that the first time lens optical signal processor is configured to convert the downstream TDM optical data signal to a downstream wavelength division multiplexed (WDM) optical data signal by means of optical Fourier transformation such that the temporal profile of the downstream TDM optical data signal is transferred into the frequency domain of the downstream WDM optical data signal, said downstream WDM optical data signal for distribution to a plurality of users via passive demultiplexing in the passive optical network, wherein a scaling factor between the downstream TDM optical data signal in the time domain and the downstream WDM optical data signal in the frequency domain is determined by the chirp rate K of the phase modulation stages according to $\Delta t = 2\pi \Delta f/K$ such that the downstream WDM optical data signal, converted by the first time lens optical signal processor, comprises at least the same number of channels as the downstream TDM optical data signal, but the channels of the downstream WDM optical data signal are separated in frequency f with separation $\Delta f = \Delta t \cdot K/2\pi$, and
    at least one receiver at the optical line terminal for receiving and processing an upstream signal from said users, said upstream signal distributed over the passive optical network.

2. The optical line terminal according to claim 1, further comprising a second time lens optical signal processor configured to convert an upstream WDM signal received from said users to an upstream TDM signal, and at least one TDM receiver for demultiplexing and processing the upstream TDM signal.

3. The optical line terminal according to claim 2, wherein the second time lens optical signal processor comprises a second phase modulation element with chirp rate $K=1/D$ followed by a dispersive medium with dispersion $D=\beta_2 L$.

4. The optical line terminal according to claim 3, wherein a predefined minimum amount of guard interval is provided in the time domain of the downstream TDM signal, the predefined minimum amount of guard interval is related to the signal bandwidth $\Delta\lambda$, the dispersion D, and the gap between a phase modulation (PM) windows $T_g$, according to $$GI \geq \frac{2\pi c}{\lambda^2} D\Delta\lambda + T_g$$

where c is the speed of the light and $\lambda$ is the signal wavelength.

5. The optical line terminal according to claim 3, wherein the first phase modulation element is a quadratic phase modulation element, and/or wherein the second phase modulation element is a quadratic phase modulation element.

6. The optical line terminal according to claim 2, wherein the second time lens optical signal processor comprises two phase modulation stages separated by a dispersive medium in a K-D-K configuration.

7. The optical line terminal according to claim 1, wherein $\delta\varphi = K_1 t^2/2$ in the first phase modulation stage with linear chirp rate $K_1$, $\delta\varphi = K_2 t^2/2$ in second phase modulation stage with linear chirp rate $K_2$, and wherein $D=\beta_2 L$ in the dispersion medium where $\beta_2$ is the $2^{nd}$ order dispersion and L is the length, such that $K_1 = K_2 = 1/D$.

8. The optical line terminal according to claim 1, wherein the transmitter comprises a multi-wavelength time and wavelength division multiplexed array configured to generate a time division multiplexed downstream optical signal at M different wavelengths, and where M is less than the number N of signal wavelengths in the downstream WDM signal.

9. The optical line terminal according to claim 7, wherein the receiver comprises a multi-wavelength time and wavelength division multiplexed array configured to receive and process a time division multiplexed upstream optical signal at M different wavelengths.

10. The optical line terminal according to claim 1, wherein the receiver is configured to receive and process a time division multiplexed upstream optical signal at a single predefined wavelength.

11. A passive optical network (PON) system comprising the optical line terminal according to claim 1.

12. The PON system according to claim 11, further comprising
    an optical fiber infrastructure for distributing the downstream and upstream signals, and
    at least one remote node for splitting the downstream WDM signal into separate wavelength signals.

13. The PON system according to claim 11, wherein the at least one remote node is configured for combining upstream separate wavelength signals into an upstream WDM signal.

14. The PON system according to claim 11, further comprising separate ONU transmitters located at each user and configured to generate separate wavelength upstream signals that can be combined to a one or more upstream WDM signals.

15. The PON system according to claim 11, further comprising separate ONU transmitters located at each user and configured to generate upstream signals at one predefined wavelength that can be combined to one or more upstream TDM signals.

16. The PON system according to claim 11, wherein each network line between the remote node(s) and the separate ONUs comprises an optical splitter for separating the upstream signal at said predefined wavelength from the downstream separate wavelength signals.

17. The optical line terminal according to claim 1, wherein the two phase modulation stages are quadratic phase modulation stages.

18. A method for generating a downstream wavelength division multiplexed (WDM) optical signal for use in a passive optical network system, comprising the steps of
    generating a time division multiplexed (TDM) downstream optical data signal by means of at least one transmitter at an optical line terminal of the passive optical network, the TDM signal comprising a number of channels that are separated in time t with separation $\Delta t$, and converting the TDM signal to a downstream WDM signal for distribution to a plurality of users via passive demultiplexing in the passive optical network by means of a first time lens optical signal processor, wherein the first time lens optical signal processor comprises two phase modulation stages separated by a dispersive medium in a K-D-K configuration, wherein $\delta\varphi=K_1 t^2/2$ in the first phase modulation stage with linear chirp rate $K_1$, $\delta\varphi=K_2 t^2/2$ in second phase modulation stage with linear chirp rate $K_2$, and wherein $D=\beta_2 L$ in the dispersion medium where $\beta_2$ is the $2^{nd}$ order dispersion and L is the length of the dispersive medium, such that $K_1=K_2=1/D$, wherein a scaling factor between the TDM signal in the time domain and the WDM signal in the frequency domain is determined by the chirp rate K of the phase modulation stages according to $\Delta t=2\pi\Delta f/K$ such that the downstream WDM optical data signal, converted by the first time lens optical signal processor, comprises at least the same number of channels as the downstream TDM optical data signal, but the channels of the downstream WDM signal are separated in frequency f with separation $\Delta f=\Delta t \cdot K/2\pi$.

* * * * *